(12) United States Patent
Jones et al.

(10) Patent No.: US 7,895,261 B2
(45) Date of Patent: Feb. 22, 2011

(54) METHOD AND SYSTEM FOR PRELOADING RESOURCES

(75) Inventors: Paul David Jones, Renton, WA (US); Christopher Richard Newcombe, Kirkland, WA (US); Richard Donald Ellis, Carnation, WA (US); Derrick Jason Birum, Duvall, WA (US); Mikel Howard Thompson, Shoreline, WA (US)

(73) Assignee: Valve Corporation, Bellevue, WA (US)

( * ) Notice: Subject to any disclaimer, the term of this patent is extended or adjusted under 35 U.S.C. 154(b) by 647 days.

(21) Appl. No.: 10/319,424

(22) Filed: Dec. 12, 2002

(65) Prior Publication Data
US 2003/0220984 A1 Nov. 27, 2003

Related U.S. Application Data

(60) Provisional application No. 60/341,079, filed on Dec. 12, 2001.

(51) Int. Cl.
*G06F 15/16* (2006.01)
(52) U.S. Cl. .................... 709/203; 709/219; 709/232; 711/137; 711/158; 707/3
(58) Field of Classification Search ............. 709/203, 709/219, 232; 711/137, 158; 707/3
See application file for complete search history.

(56) References Cited

U.S. PATENT DOCUMENTS

| 2,331,814 A | 10/1943 | Taylor |
| 4,310,720 A | 1/1982 | Check, Jr. |
| 4,920,487 A | 4/1990 | Baffes |
| 4,999,766 A | 3/1991 | Peters et al. |
| 5,305,389 A * | 4/1994 | Palmer ........................ 382/305 |
| 5,325,526 A | 6/1994 | Cameron et al. ............ 395/650 |
| 5,343,526 A | 8/1994 | Lassers |
| 5,349,643 A | 9/1994 | Cox et al. |

(Continued)

FOREIGN PATENT DOCUMENTS

EP 0841615 5/1998

(Continued)

OTHER PUBLICATIONS

Rajiv Jauhari et al., "Priority-Hints: An Algorithm for Priority-Based Buffer Management". Proceedings of the 16th VLDB Conference, Brisbane, Australia, 1990, pp. 708-721.*

(Continued)

*Primary Examiner*—Thuong T Nguyen
(74) *Attorney, Agent, or Firm*—Frommer Lawrence & Haug LLP; John W. Branch

(57) ABSTRACT

A method and system for preloading data is provided. Resources are preloaded on a client before they are needed by an application. Application hints and static resources lists may be used to indicate resources are needed. The application may begin execution before receiving all of the resources associated with the application. Preloading may be done during execution of an application, or when the application is not executing. Preloading allows an application to run smoothly without consuming more resources than are needed by an application. A prediction graph may be generated that is used in predicting the resources that are likely to be needed by the application. An analyzer may also be used to simulate the system and adjust parameters used in creating the prediction graph.

27 Claims, 15 Drawing Sheets

USING APPLICATION HINTS TO PRELOAD DATA

U.S. PATENT DOCUMENTS

| | | | |
|---|---|---|---|
| 5,495,533 A | 2/1996 | Linehan et al. | |
| 5,535,276 A | 7/1996 | Ganesan | |
| 5,606,693 A | 2/1997 | Nilsen et al. | |
| 5,613,089 A | 3/1997 | Hornbuckle | |
| 5,619,716 A | 4/1997 | Nonaka et al. | |
| 5,634,107 A | 5/1997 | Yumoto et al. | |
| 5,732,275 A | 3/1998 | Kullick et al. | |
| 5,737,495 A * | 4/1998 | Adams et al. | 707/104.1 |
| 5,742,829 A | 4/1998 | Davis et al. | |
| 5,757,919 A | 5/1998 | Herbert et al. | |
| 5,764,992 A | 6/1998 | Kullick et al. | |
| 5,802,292 A | 9/1998 | Mogul | |
| 5,808,690 A | 9/1998 | Rich | |
| 5,819,082 A | 10/1998 | Marion | 395/607 |
| 5,829,001 A | 10/1998 | Li et al. | |
| 5,835,601 A | 11/1998 | Shimbo et al. | |
| 5,850,535 A | 12/1998 | Maystrovsky et al. | |
| 5,862,339 A | 1/1999 | Bonnaure et al. | |
| 5,915,112 A | 6/1999 | Boutcher | |
| 5,924,094 A | 7/1999 | Sutter | |
| 5,926,624 A | 7/1999 | Katz et al. | |
| 5,933,835 A * | 8/1999 | Adams et al. | 707/104.1 |
| 5,960,189 A | 9/1999 | Stupek, Jr. et al. | |
| 5,970,143 A | 10/1999 | Schneier | |
| 5,982,893 A | 11/1999 | Hughes | |
| 5,999,740 A | 12/1999 | Rowley | |
| 6,009,528 A | 12/1999 | Teraoka | |
| 6,018,717 A | 1/2000 | Lee et al. | |
| 6,029,175 A | 2/2000 | Chow et al. | |
| 6,105,074 A | 8/2000 | Yokote et al. | |
| 6,119,203 A * | 9/2000 | Snyder et al. | 711/137 |
| 6,119,235 A | 9/2000 | Vaid et al. | |
| 6,122,372 A | 9/2000 | Hughes | |
| 6,122,657 A | 9/2000 | Hoffman, Jr. et al. | |
| 6,128,712 A * | 10/2000 | Hunt et al. | 711/158 |
| 6,154,767 A * | 11/2000 | Altschuler et al. | 709/203 |
| 6,195,622 B1 * | 2/2001 | Altschuler et al. | 703/2 |
| 6,219,793 B1 | 4/2001 | Li et al. | |
| 6,223,166 B1 | 4/2001 | Kay | |
| 6,256,773 B1 | 7/2001 | Bowman-Amuah | |
| 6,269,400 B1 | 7/2001 | Douglas et al. | |
| 6,292,465 B1 | 9/2001 | Vaid et al. | |
| 6,292,889 B1 | 9/2001 | Fitzgerald et al. | |
| 6,314,409 B2 | 11/2001 | Schneck et al. | |
| 6,317,786 B1 | 11/2001 | Yamane et al. | |
| 6,324,578 B1 | 11/2001 | Cox et al. | |
| 6,332,198 B1 | 12/2001 | Simons et al. | |
| 6,338,072 B1 | 1/2002 | Durand et al. | 707/205 |
| 6,351,775 B1 | 2/2002 | Yu | |
| 6,366,947 B1 * | 4/2002 | Kavner | 709/203 |
| 6,381,742 B2 | 4/2002 | Forbes et al. | |
| 6,397,258 B1 * | 5/2002 | Tsuji et al. | 709/233 |
| 6,430,608 B1 | 8/2002 | Shaio | |
| 6,438,141 B1 | 8/2002 | Hanko et al. | |
| 6,438,559 B1 | 8/2002 | White et al. | |
| 6,453,353 B1 | 9/2002 | Win et al. | |
| 6,466,979 B1 | 10/2002 | Plouffe, Jr. | |
| 6,473,793 B1 | 10/2002 | Dillon et al. | |
| 6,487,455 B1 | 11/2002 | Balasubramanian | 700/2 |
| 6,505,255 B1 | 1/2003 | Akatsu et al. | |
| 6,546,554 B1 | 4/2003 | Schmidt et al. | |
| 6,578,054 B1 | 6/2003 | Hopmann et al. | |
| 6,578,102 B1 * | 6/2003 | Batchelor et al. | 710/310 |
| 6,584,568 B1 | 6/2003 | Dircks et al. | |
| 6,611,812 B2 | 8/2003 | Hurtado et al. | |
| 6,618,810 B1 | 9/2003 | Dirie | |
| 6,675,382 B1 | 1/2004 | Foster | |
| 6,678,700 B1 | 1/2004 | Moore et al. | |
| 6,684,396 B1 | 1/2004 | Brittain et al. | |
| 6,694,450 B1 | 2/2004 | Kidder et al. | |
| 6,697,378 B1 | 2/2004 | Patel | |
| 6,711,593 B1 | 3/2004 | Gordon et al. | |
| 6,718,549 B1 | 4/2004 | Narin et al. | |
| 6,721,786 B1 | 4/2004 | Gordon et al. | |
| 6,735,601 B1 | 5/2004 | Subrahmanyam | |
| 6,738,970 B1 | 5/2004 | Kruger et al. | |
| 6,748,470 B2 | 6/2004 | Goldick | |
| 6,751,608 B1 * | 6/2004 | Cohen et al. | 707/3 |
| 6,752,313 B1 | 6/2004 | Caviles et al. | |
| 6,754,821 B1 | 6/2004 | Berson et al. | |
| 6,766,428 B2 | 7/2004 | Saulsbury et al. | |
| 6,771,290 B1 | 8/2004 | Hoyle | |
| 6,775,704 B1 | 8/2004 | Watson et al. | |
| 6,795,435 B1 | 9/2004 | Jouppi et al. | |
| 6,799,276 B1 | 9/2004 | Belissent | |
| 6,807,542 B2 | 10/2004 | Bantz et al. | |
| 6,829,649 B1 | 12/2004 | Shorey et al. | |
| 6,848,028 B1 * | 1/2005 | Sugumar et al. | 711/137 |
| 6,862,616 B1 | 3/2005 | Tompkins | |
| 6,868,539 B1 | 3/2005 | Travison et al. | |
| 6,871,344 B2 | 3/2005 | Grier et al. | |
| 6,871,345 B1 | 3/2005 | Crow et al. | |
| 6,880,086 B2 | 4/2005 | Kidder et al. | |
| 6,883,168 B1 | 4/2005 | James et al. | |
| 6,895,506 B1 | 5/2005 | Abu-Husein | |
| 6,912,520 B2 | 6/2005 | Hankin et al. | |
| 6,930,984 B1 | 8/2005 | Nomura et al. | |
| 6,938,005 B2 | 8/2005 | Iverson et al. | |
| 6,950,523 B1 | 9/2005 | Brickell et al. | |
| 6,961,341 B1 | 11/2005 | Krishnan | |
| 6,981,070 B1 | 12/2005 | Luk et al. | |
| 6,986,133 B2 | 1/2006 | O'Brien et al. | |
| 6,996,599 B1 | 2/2006 | Anders et al. | |
| 7,000,230 B1 | 2/2006 | Murray et al. | |
| 7,016,877 B1 | 3/2006 | Steele et al. | |
| 7,035,943 B2 | 4/2006 | Yamane et al. | |
| 7,055,027 B1 | 5/2006 | Gunter et al. | |
| 7,058,607 B1 | 6/2006 | Miyawaki et al. | |
| 7,131,111 B2 | 10/2006 | Passanisi | |
| 7,143,143 B1 | 11/2006 | Thompson | |
| 7,243,226 B2 | 7/2007 | Newcombe et al. | |
| 7,269,854 B2 | 9/2007 | Simmons et al. | |
| 7,301,944 B1 | 11/2007 | Redmond | |
| 7,350,076 B1 | 3/2008 | Young et al. | |
| 7,350,231 B2 | 3/2008 | Madison et al. | |
| 2001/0044850 A1 | 11/2001 | Raz et al. | |
| 2002/0029244 A1 | 3/2002 | Suzuki et al. | |
| 2002/0035526 A1 | 3/2002 | Kutaragi et al. | |
| 2002/0049580 A1 | 4/2002 | Kutaragi et al. | |
| 2002/0059408 A1 | 5/2002 | Pattabhiraman et al. | |
| 2002/0075844 A1 | 6/2002 | Hagen | |
| 2002/0083178 A1 | 6/2002 | Brothers | |
| 2002/0112178 A1 | 8/2002 | Scherr | |
| 2002/0124093 A1 | 9/2002 | Nakai | |
| 2002/0147929 A1 | 10/2002 | Rose | |
| 2002/0150253 A1 | 10/2002 | Brezak et al. | |
| 2002/0165026 A1 | 11/2002 | Perkins et al. | |
| 2002/0166117 A1 | 11/2002 | Abrams et al. | |
| 2002/0169876 A1 | 11/2002 | Curie et al. | |
| 2002/0172222 A1 | 11/2002 | Ullmann et al. | |
| 2003/0009365 A1 | 1/2003 | Tynan et al. | |
| 2003/0039211 A1 | 2/2003 | Hvostov et al. | |
| 2003/0105827 A1 | 6/2003 | Tan et al. | |
| 2004/0177120 A1 | 9/2004 | Kirsch | |
| 2004/0215793 A1 | 10/2004 | Ryan et al. | |
| 2007/0038759 A1 | 2/2007 | Hanson et al. | |

FOREIGN PATENT DOCUMENTS

| | | |
|---|---|---|
| EP | 1150207 | 10/2001 |
| GB | 2348721 | 10/2000 |
| JP | 10171635 A | 6/1998 |
| WO | WO 00/55729 | 9/2000 |
| WO | WO 01/25871 | 4/2001 |

| | | |
|---|---|---|
| WO | 0161486 | 8/2001 |

OTHER PUBLICATIONS

Rajiv Jauhari, Priority-Hints: An Algorithm for Priority-Based Buffer Management, University of Wisconsin, Madion, WI 53706, Proceedings of the 16yh VLDB Conference Brisbane, Australia 1990.*

Written Opinion for PCT/US02/39975, dated May 31, 2006, 7 pages.

International Preliminary Examination Report dated Oct. 17, 2006, for PCT International Application No. PCT/US02/39975, filed Dec. 12, 2002.

Microsoft Corporation, Microsoft Windows 2000 Server Operating System, "Windows 2000 Kerberos Authentication," White Paper, 46 pages (1999).

Jauhari, Rajiv et al.: "Priority-Hints: An Algorithm for Priority-Based Buffer Management," Proceedings of the 16th VLDB Conference, Brisbane, Australia, 1990, pp. 708-721.

U.S. Appl. No. 11/737,677, filed Apr. 19, 2007, Official Communication mailed Feb. 25, 2009, 13 pages.

U.S. Appl. No. 10/317,851, filed Dec. 11, 2002, Notice of Allowance mailed Apr. 3, 2009.

International Preliminary Examination Report dated Oct. 17, 2006, for PCT International Application No. PCT/US02/39975, filed Dec. 12, 2002, 6 pages.

U.S. Appl. No. 10/317,845, filed on Dec. 11, 2002, Official Communication mailed Apr. 18, 2008, 28 pages.

U.S. Appl. No. 10/319,424, filed Dec. 12, 2002, Official Communication mailed Apr. 21, 2009, 29 pages.

Agarwal et al., Modular Synchronization in Distributed, Multiversion Datatbase: Version Control and Concurrency Control, 1993, pp. 126-137, IEEE.

Slein et al., Requirements for Distributed Authoring and Versioning on the World Wide Web, 1997, pp. 17-24, IEEE.

Nicola et al., Modeling of Correlated Failures and Community Error Recovery in Multiversion Software, 1990, pp. 350-359, IEEE.

* cited by examiner

| Resource Name | File | Offset | Length |
|---|---|---|---|
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |
| Resource Name | File | Offset | Length |

*FIG. 8*

METHOD AND SYSTEM FOR PRELOADING RESOURCES

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. §119(e).

BACKGROUND

In the past, when a user desired to change versions of software, the user was required to go to a store, purchase the new software, and install the new version on the user's computer.

Today, some software, including some upgrades, is distributed over the Internet. If the software can be packaged in a small executable, a software vendor may choose to distribute the software over the Internet. Using this model, a user can browse to a vendor's Website, pay for software, and then download the software.

This model has problems when the software requires a lot of disk space or when the user has an Internet connection with relatively low bandwidth. For example, to download a CD's worth of software (650 Megabytes) using a computer having a 28.8 kilobits per second (Kbs) connection to the Internet would take over 50 hours to download. Even with a 512 Kbs connection, downloading 650 Megabytes of software would take almost three hours—assuming that the connection remained up and delivered its full bandwidth.

What is needed is an efficient way to provide the application to the user over the Internet.

SUMMARY

A method and system is provided which is directed at preloading resources for an application. Preloading the resources allows an application to run smoothly without consuming more resources than are needed by an application at any point during the execution.

According to one aspect of the invention, a determination is made as to what resources will be needed by an application. The resource list may be static or dynamic.

According to another aspect of the invention, application hints are used in generating the resources needed by the application. The application hints may indicate a state of the application. The resources that will be needed may be determined based on the state information.

According to another aspect of the invention, a preloader may load resources both while the application is executing and also when the application is not executing. The preloader process that determines which resources to load may be located on the client or on the server.

According to yet another aspect of the invention a prediction graph may be used to anticipate the resources that are likely to be needed by an application. State changes within the application may be used in generating the prediction graph.

According to a further aspect of the invention, parameters may be adjusted to fine tune the prediction graph. The parameters may be adjusted manually or automatically. A simulation tool may be used to simulate the behavior of the system. The simulation tool may tune itself iteratively until the system performs at a predetermined level of acceptability.

BRIEF DESCRIPTION OF THE DRAWINGS

FIG. 8 shows an exemplary resource name mapping table;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. The term "resource" is any data an application uses for execution. For example, a resource may be a particular portion of a file. The file may be a data file, a dynamic link library, an executable program, a component, and the like.

These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

Application Hints to Preload Data

Figure 4:
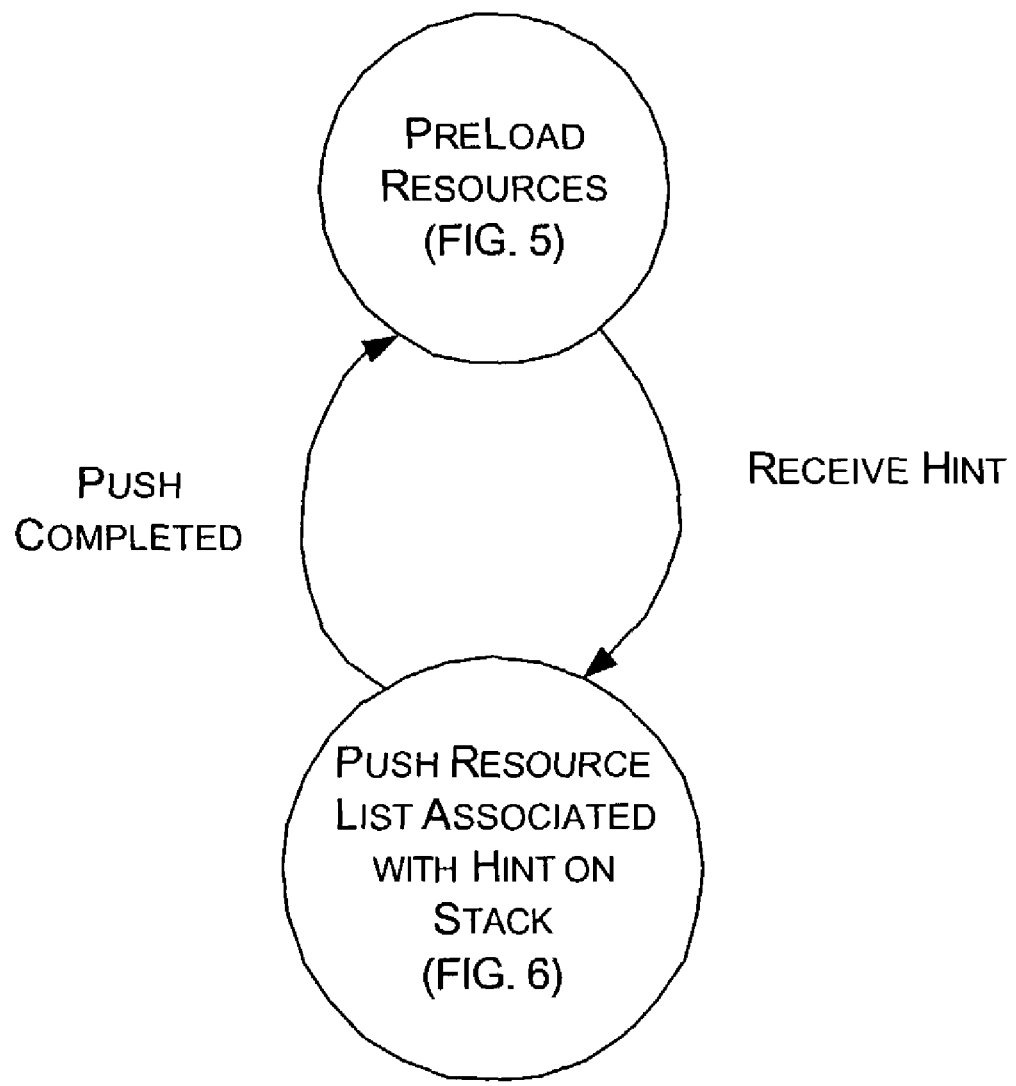
FIG. 4 illustrates using application hints to preload data.

FIG. 4 illustrates using application hints to preload data, in accordance with aspects of the invention. A preloader attempts to load resources before they are needed by an application. The preloader may run as a thread of an application, as part of an application's flow, for example as a function that is called periodically, and/or separate from the application. An application hint is used to indicate that a resource should be preloaded. The hint may include a list of files, such as a resource list, that should be preloaded. The hint may indicate the priority of the loading for the resource. For example, the application hint may indicate that a resource list should be loaded immediately, i.e., that the preloader should stop preloading what it is currently loading and begin loading resources from the resource list immediately.

Hints may arise in a variety of circumstances. For example, some electronic games have multiple levels or maps on which users play. In some games, these maps are changed periodically. At a certain point before the map is changed, a hint may be provided to a preloader indicating that the preloader should begin preloading resources for the next map. The hint may include a list of resources in the next map that the preloader should preload.

As another example, a user may pass a certain point in the game. For example, the user may enter a certain room that is close to a set of stairs that is leading up or down. When the user enters the room, a hint may be provided to a preloader indicating that resources from a lower or upper level should be loaded. This helps to ensure that the user does not wait for these resources to load, should the user decide to take the stairs.

In an application suite including a word processor and a spreadsheet, for example, a user may select a print menu. When the user selects the print menu, a hint may be provided to the preloader indicating that printer drivers and routines should be preloaded in case the user decides to print the document. Alternatively, if a user stops working with the word processor and begins working with the spreadsheet, a hint may be provided to the preloader indicating that the preloader should stop loading resources required for the word processor and begin loading resource that may be needed for the spreadsheet. As can be seen, hints may be used to indicate any status within an application in which resources are needed.

In one embodiment of the invention, the capability to indicate a hint may be provided in an API that interfaces between the application and the file system. The API may allow both the application and an external application to provide hints to the preloader.

For example, an administrator or creator of a game may decide to put a special monster in a particular part of the game universe. An application the administrator is using may send messages to APIs on user machines telling the APIs that they should use hints to preload certain resources if a user is near the place where the monster will be placed. The API may pass the hint to the user application or query a user application for the user's current position. The application may also send a resource list with its message to each API. The API may use the resource list to provide a hint and/or may pass the resource list to the application so that if the user is close to the monster's area, a hint may be provided to the preloader that includes the resource list.

As another example, an application might be keyed to the actual weather local to a user. When the user enters the application, the application may request the local weather. The application may then hint to a preloader that certain weather resources, such as texturing and rain routines, should be preloaded.

Resources may be loaded for a user's currently subscribed to content as well as non-currently subscribed content. For instance, preloading may be used too "trickle-download" large sets of data before a new application is released. By utilizing the available time to download content this helps to ensure that potential subscribers have the majority of bits for the new version/release/application, or other content before it is needed. Using this preloading scheme, the use of bandwidth may be effectively controlled. Preloading may also be used to send down marketing, ads, demo applications, and the like. Although the user has some control over the preloading (like on/off and cpu/memory/disk/network usage) these means of preloading are generally invoked by the publisher/ provider.

Figure 5:
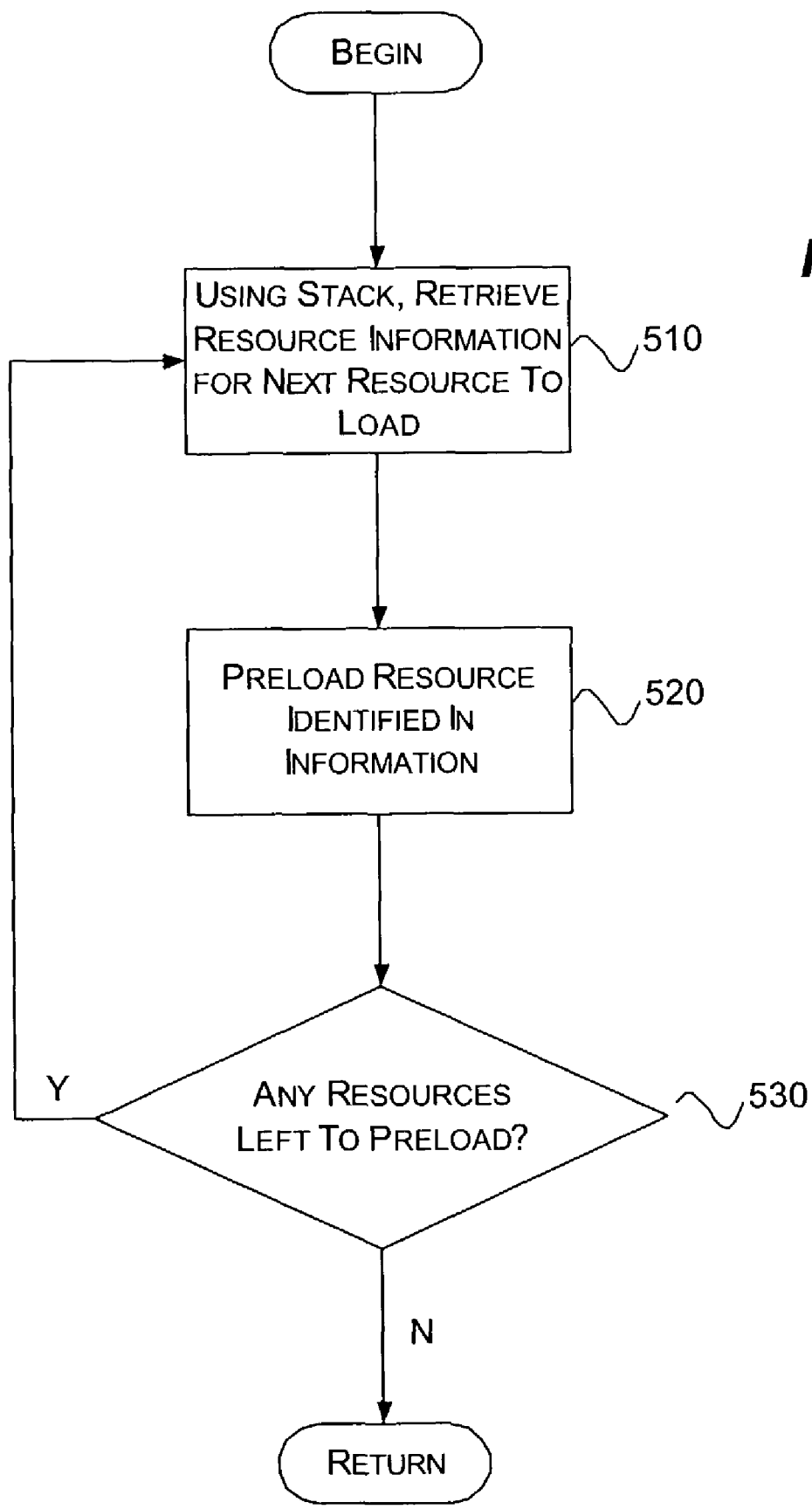
FIG. 5 illustrates a process for retrieving and using resource information to preload resources.

FIG. 5 illustrates a process for retrieving and using resource information to preload resources, in accordance with aspects of the invention. In one embodiment of the invention, the preloader may load resources from a stack. There may be a stack for each priority level such that the next resource that is loaded will be the resource with the next highest priority level. Accordingly, a push of a lower priority resource onto a stack does not block a higher priority hint. When a hint is provided to the preloader, the preloader may push references to resources in a resource list associated with the hint onto the stack and adjust its stack pointer to point to the first resource in the hinted resource list. After a start block, the process flows to block 510 where using the stack the process retrieves information for the next resource to load. Moving to block 520, the resource is preloaded. Transitioning to decision block 530, a determination is made as to whether there are any resources left to preload. When there are still resources remaining to preload, the process returns to block 510, otherwise, the process moves to a return block where it returns to processing other actions.

Figure 6:
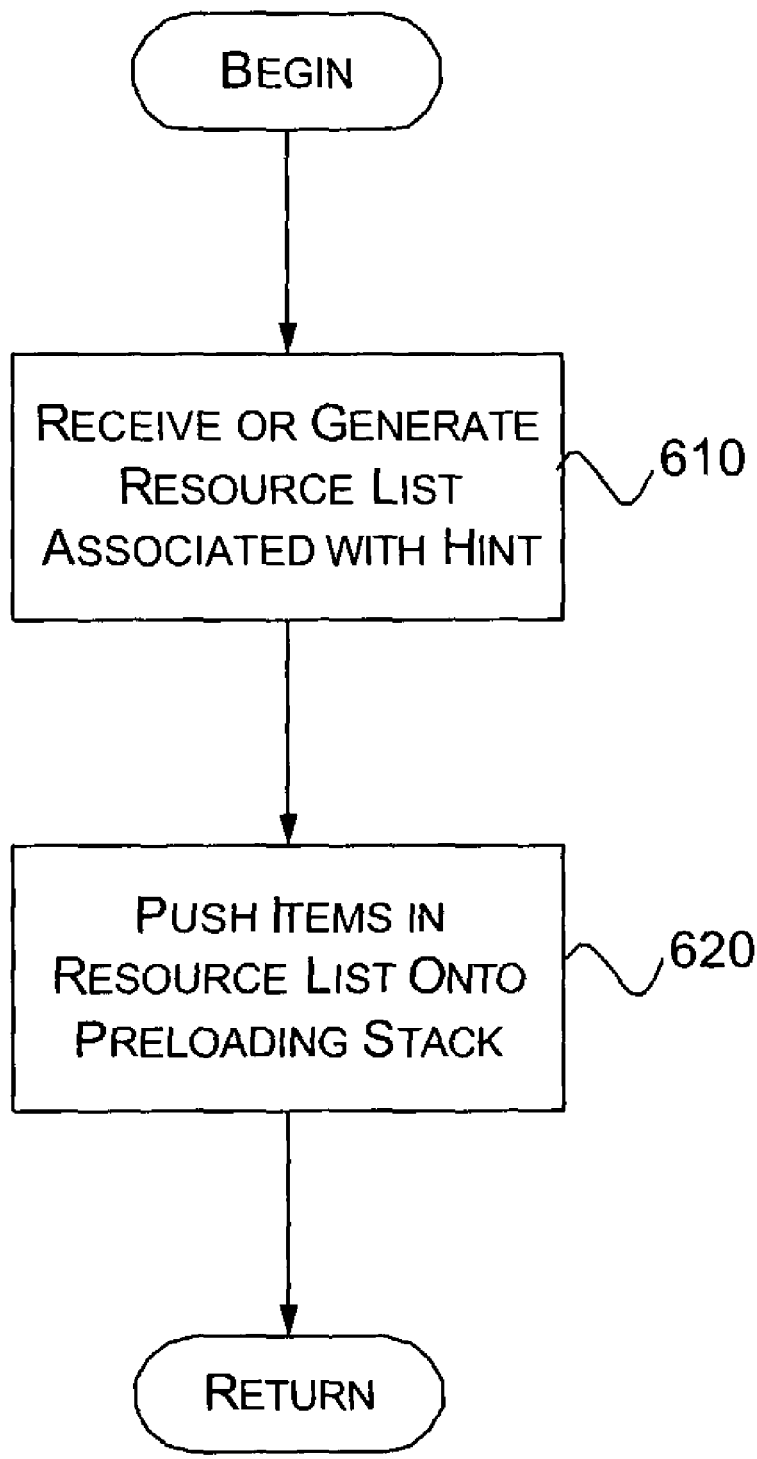
FIG. 6 shows a process for receiving or generating resource lists associated with application hints.

After the preloader has preloaded all the resources on the hinted resource list, the stack pointer may be popped and thereby point to the resource the preloader was preloading before the hint was received. Alternatively, the preloader may wait to finish loading a resource before beginning processing any of the resources listed in a hint resource list. FIG. 6 shows a process for receiving or generating resource lists associated with application hints. After a start block, the process moves to block 610 where a resource list associated with a hint is received or generated (See FIGS. 13-15 and related discussions for exemplary methods of generating a resource list). Moving to block 620, the items are pushed onto the preloading stack. The process then returns to processing other actions.

Figure 13:
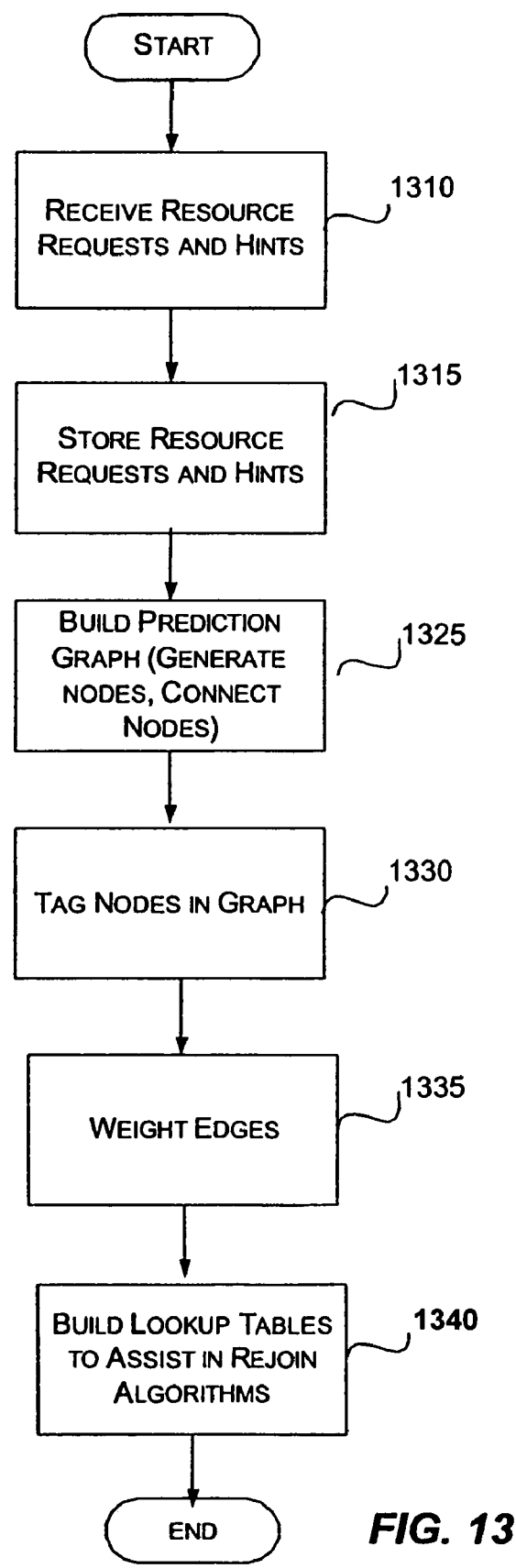
FIG. 13 illustrates a process to generate a prediction graph.

FIG. 13 illustrates a process to generate a prediction graph, in accordance with aspects of the invention. A predictor may be used to predict what resources will be needed and be used in the generation of a resource list. The resource requests and resource hints received from applications during previous execution sessions (e.g. pre-release testing, or real usage sessions of the released application, or simulated usage driven by artificially intelligent agents (often called 'bots' instead) of human users) (block 1310) may be stored (block 1315) and later processed and combined using various algorithms to build a prediction graph. The prediction graph's nodes each represent an "application resource request state", considered as being the sequence of resource requests (state transitions) that lead from the 'origin' of the graph (representing application startup, before any resources have been requested) to this particular node (block 1325). Each node in the graph may be tagged with a resource identifier or group of resource identifiers, or an application resource hint identifier, which describes the request or group of requests that the application made to transition from a previous state (node) to this present state (node) (block 1330). The prediction graph's edges (connections between nodes) each represent a prediction based on historical evidence, manual configuration or algorithmic speculation, that one application "resource request state" is transformed into another by moving from node to node along that edge. Each edge may be weighted by any combination of probability of request, time interval between requests, or other relevant data to indicate the strength of the prediction (likelihood) of that particular state transition (block 1335). The prediction graph is therefore directed (edges have a direction) and may be cyclic, acyclic, or a tree. Examples of algorithms used to combine and process the session lists into the prediction graph are those identifying exact or inexact common subsequences (including longest common subsequences), those utilizing Bayes' Theorem, or those used to construct Markov Chains, Markov Models, Hidden Markov Models, or other relevant algorithms. An application may have very many of theses states and transitions so nodes and edges may be merged or removed according to various algorithms (usually degrading prediction quality to some degree) with the goal of constraining the size of the graph. The 'session lists' of resource requests used to build the prediction graph may be saved and gathered from the clients that run the application, or from the content servers that are satisfying the client's resource requests. Next, lookup tables are built to assist in the rejoin algorithm (block 1340).

Figure 14:
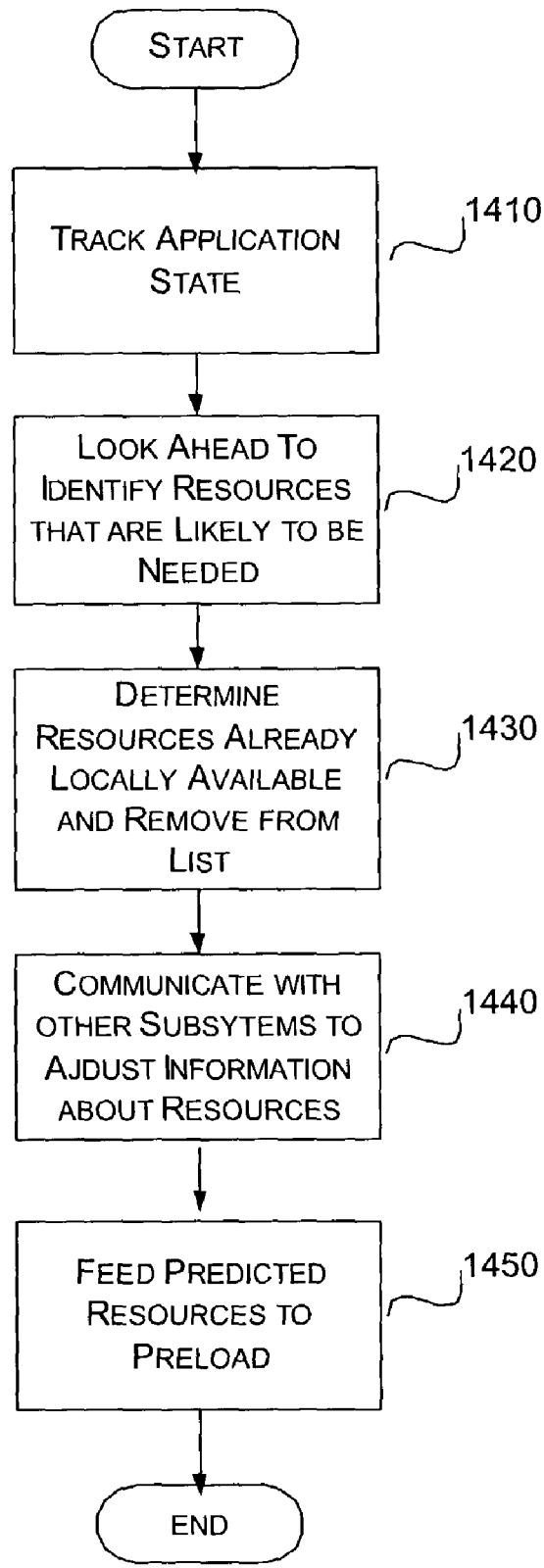
FIG. 14 shows a predictor using the prediction graph.

FIG. 14 shows a predictor using the prediction graph, in accordance with aspects of the invention. The resulting prediction graph may be used by a 'predictor' component during later runs of the application to predict the application's short or medium-term resource needs in a way which responds to changes in application state. The predictor represents the application's current 'resource request state' as a reference to a particular node in the prediction graph. The predictor tracks how this state changes as the application makes new resource requests and thereby "moves through the prediction graph" (block 1410) (e.g. If the application most recently requested resource "A" then the current state will be a reference to a node that identifies resource "A". If this node has branches (predictions) to three nodes that in turn identify resources "C", "D" and "E", and the application now requests resource "D", then the predictor considers that the application's "resource request state" has moved to the node found along the middle branch which identifies resource "D". From time to time (e.g. after each application resource request or possibly less often) the predictor looks ahead in the graph from the 'current state' to identify resources that are most likely to be required next (block 1420). The predictor may build an ordered list of predicted resources by instituting a limited breadth-first or depth-first or other search of the graph from the 'current state' node (possibly taking measures to avoid revisiting cycles in the graph). The predictor may then eliminate from this list any resources that are already present on the local storage device (block 1430). The predictor may also communicate with other subsystems (e.g. local resource cache) to adjust information about any of the predicted resources that are already present on the local storage device (e.g. by adjusting their 'least recently used' timestamps, or tagging or reclassifying them in some way), in order to reduce the chances of those resources being purged from local storage in the immediate future, thus recognizing that these resources may have increased value as they have been mentioned in a prediction (block 1440). The predictor then feeds the resulting list of predicted resources to a preloader (block 1450). Therefore, instead of just loading the resources from requests from an application, the predictor will direct the preloader to load additional resources based on the prediction graph. The predictor may be more responsive to the short-term needs of applications with very large state domains or non-linear state traversal (e.g., a player wandering in any direction in a large game world). The predictor may therefore work in parallel with the system of large static resource lists described elsewhere. The predictor may assign priorities to its predictions that are above the priority of those static resource lists and below the priority of urgent (blocking) application requests.

As the number of application states and state-traversals is typically extremely large, it is unlikely that the 'training data' (lists of resource requests and hints gathered from previous execution sessions) used to build the prediction graph will be exhaustively complete (e.g. users may not have fully explored the game world or application feature set, or performed every permutation of every possible action). If, when using the prediction graph, the application happens to 'step off the graph' by requesting a resource that is not one of the current state's (node's) immediate predictions) then the predictor no-longer tracks the application's state transitions though the graph. When this situation occurs, the predictor may resort to a number of secondary alternative or backup prediction algorithms; e.g. the predictor may utilize a table that when indexed by resource identifier gives the identifiers of the most likely one (or several) resources that the application will request after requesting the indexed resource, regardless of application state. The predictor will continuously attempt to find a good node in the prediction graph at which to rejoin it, based on any relevant information. Examples of such information are locality of state, the application's most recent series of resource requests, and it's next several requests (The latter arrive over a period time, so the predictor may have to use the backup prediction algorithms multiple times until it obtains sufficient new data (new application requests) to find a good rejoin node.) For example, both the 'request history before step-off' and accumulating 'request history since step-off' sequences may be pattern-matched against sequences in the prediction graph in various ways in order to identify a good rejoin node. Searching and pattern matching may exploit locality of reference—e.g. prefer to search various branches just ahead of the "last known good" state of the application (just before it stepped off the graph) as a good rejoin point may be more likely to be found in this 'close future' part of the graph. Pattern matching and searching may spread out from the step-off node, both forwards and backwards through the graph until the predictor finds a good rejoin point. The algorithms used for this pattern matching may be similar to those used to process and combine the original training data to form the prediction graph.

The prediction graphs described may be treated as just another application resource. New prediction graphs can be generated from server logs and automatically sent to client (as described in a related patent entitled, METHOD AND SYSTEM FOR UPGRADING AND ROLLING BACK VERSIONS, U.S. Pat. No. 6,996,817, issued Feb. 7, 2006, which is hereby incorporated by reference), which transparently improves their preloading ability.

In another embodiment, individual clients may be able to modify their prediction graphs as the user drives the application. For example, when the predictor component 'steps off the graph' (fails to make a prediction) and later finds a good rejoin point, the predictor may add a branch from the step-off point to the rejoin point, in order to learn that transition (prediction) for subsequent sessions. The client application may also report such modifications to a central server for incorporation into the primary prediction graph.

The application may use one large prediction graph encompassing all of the training data (session lists), or several smaller prediction graphs, independently generated using groups or sections of session lists identified as being delimited by significant large-scale state changes in the application (e.g. a game application may use a separate prediction graph for each separate game map or game world it contains, as such game worlds may be very different to each other).

Figure 15:
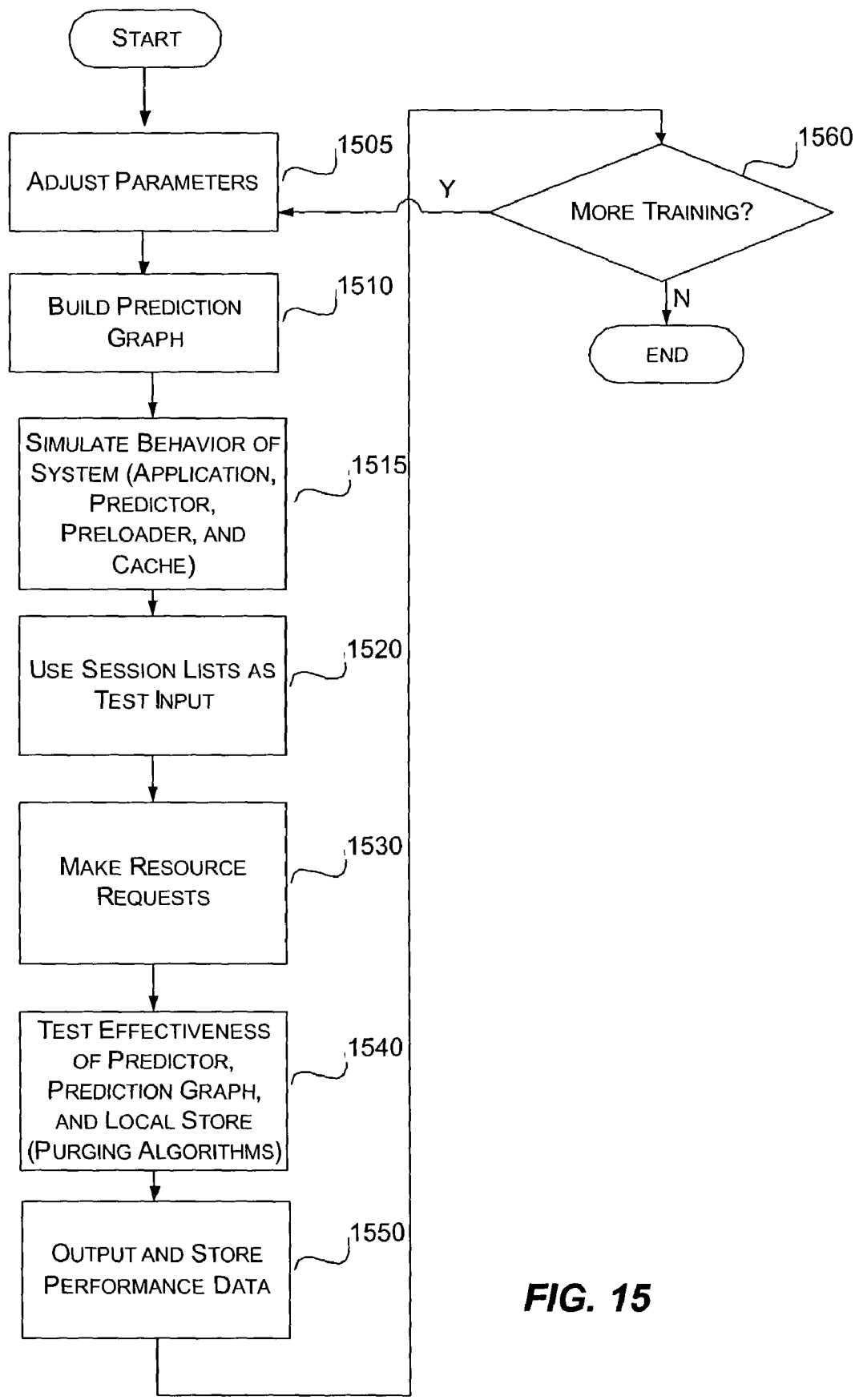
FIG. 15 illustrates an iterative simulation/tuning loop for building a prediction graph by adjusting parameters, in accordance with aspects of the invention.

FIG. 15 illustrates an iterative simulation/tuning loop for building a prediction graph by adjusting parameters, in accordance with aspects of the invention.

The algorithms used to process and combine the session lists into the prediction graph may have many parameters that affect their behavior. Examples of such parameters include: InfluenceOfElapsedTimeInPredictionWeight, InfluenceOfDistanceFromStepOffPoint-WhenConsideringRejoinNodes, InfluenceOfNumberOfSequenceMismatchesWhenConsideringRejoinNodes, and many others. Many of these parameters are extremely sensitive. Tiny changes in the value can cause very large differences in the resulting prediction graphs. It may therefore difficult for a human to find the best (or even a good) set of parameter values to generate a prediction graph that makes good predictions while being as small (few nodes and edges) as possible.

In one embodiment, Graphical User Interface visualization tools are used to adjust the parameters and view the resulting prediction graph. In another embodiment, a degree of automation is used to help find good prediction graphs. A set of initial values for parameters is chosen (block 1505), either by a human or automatically (either randomized or remembered from previous sessions). A prediction graph is then generated from training data as described within this disclosure (block 1510). The prediction graph is then given to an analyzer component that tests its effectiveness.

The analyzer simulates the behavior of the system; i.e. the application making resource requests, the predictor component tracking state changes and making predictions, the preloader acquiring resources, and the local storage cache holding and purges acquiring resources (block 1515). The analyzer is a simulator so no actual resources are transferred, but the sizes of resources are known such that their transfer times over a network with certain average bandwidth can be calculated in order to know when preloaded resources actually arrive in the local storage cache. This helps to ensure correctly predicting cache misses. The analyzer uses session lists as test input and these are acquired in the same manner as the session lists that were used as training data to build the prediction graph (block 1520). The analyzer simulates the application making resource requests by making requests taken in order from a chosen session list (block 1530) The analyzer tests the effectiveness of the combined predictor component, prediction graph, and local store (purging algorithms) (block 1540). The analyzer then outputs performance data that indicate the effectiveness of the system (block 1550). In one embodiment, the performance data includes NumberOfCacheMisses, NumberOfFailedPredictions, NumberOfCacheHitsInPredictions, NumberOfCacheHitsNotInCurrentPredictions, HighestNumberOfRetriesToFindARejoinNode, AverageNumberOfRetriesToFindARejoinNode, and many others. The analyzer may test the system using the actual training lists that were used to build the prediction graph, in which case the system is expected to do well (have few incorrect predictions and few cache misses). If the system does not do well then this indicates that the prediction graph may be too weak and more training data is needed or the creation algorithm parameters are not optimal and should be adjusted. The analyzer may also test the system using session lists that were never used as training data. These assess the ability of entire system. (predictor, prediction graph, local cache purging) to cope with new 'untrained' sequences of application requests. More 'failed predictions' ('step off the graph') events are expected so these test quality of the backup prediction algorithms and the algorithms used to find good rejoin nodes.

The performance data output by these tests is stored with the parameters that affected the creation of the prediction graph and any decisions made by the predictor component or local cache purging component. If the performance data are not acceptable in any way (do not meet any desired combination of weighted threshold tests) (block 1560), then the analyzer tool may adjust any of the parameters mentioned, regenerate the prediction graph if needed and re-run the above tests by returning to block 1505. This automatic iterative process is directed at finding the best performing system (best performance data). As many of the parameters are extremely sensitive and have non-linear affects on system performance, various algorithms may be used to adjust the parameters for the next iteration. Such algorithms include heuristics ('rules of thumb') input by a human or learned automatically over time as having a good affect in previous analyzer sessions, Fuzzy Logic (a method utilizing the 'fractional truth-hood' of multiple 'if-condition-then-action rules' (each of which is somewhat similar to a heuristic); these rules all work ('fire') in parallel and the results are combined and then 'defuzzified' using various standard algorithms to produce a final precise decision of how to adjust the system to achieve a desired affect), Neural Networks, or any other relevant algorithms that allow complex non-linear functions to be modeled and adjusted.

It will be recognized that many other data structures and mechanisms may be used to preload resources associated with a resource hint list in the way described above. For example, the stack may include pointers to resource list objects. Each resource list object may keep track of which resource should be loaded next when the object is being used to preload resources. Using this mechanism, a hint may cause a new pointer to a resource object to be pushed on the stack. The newly pushed resource object may then be activated and used to begin preloading resources. When all the resources associated with the resource object have been preloaded, the stack may discard the pointer to the resource object and pop a pointer to the resource object used just previous to the hint being received.

It will be recognized that the above mechanisms of pushing resource lists (or pointers) allow multiple hints to be received and stored on a stack, with the most recent hint being used to preload resources. Another hint may be received while resources associated with a current hint are being preloaded. Receiving another hint may cause preloading of the resources associated with a current hint to be suspended until the resources associated with the other hint are preloaded.

In another embodiment of the invention, a reference from a resource list may be inserted anywhere in a preloader's list of resources to load. For example, a first-in-first-out queue, a priority queue, a linked list, or a graph could be used by a preloader to determine which resource should be loaded next. According to an embodiment of the invention, a queue is maintained for each priority level. For example, if there are three different priority levels then there are three queues. In this way, the highest priority queues may be checked before lower priority queues are checked. An application could specify that resources associated with a hint should be loaded after a preloader has loaded other resources. This could be done, for example, by inserting references to the resources of a resource list at a desired location in a preloader's linked list of resources to load. This might be done, for example, using a predictive search mechanism that tries to determine which resources should be loaded next. A priority level is associated with the hint. Based on the priority level of the hint, the resource is loaded into the appropriate queue. According to one embodiment of the invention, application hints include a default priority level. Alternatively, the application may assign the priority level.

Using Resource Lists to Preload Data

Figure 7:
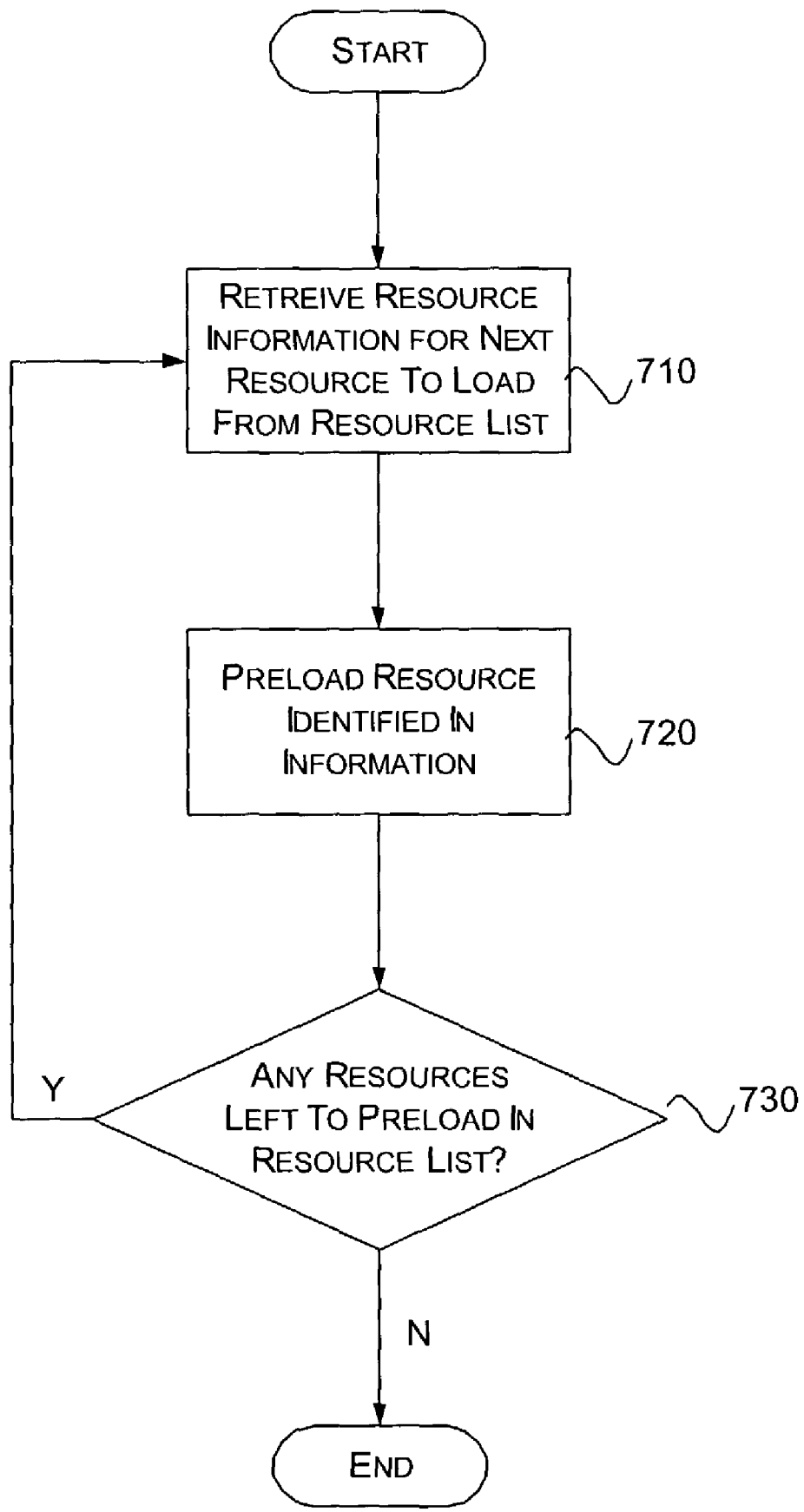
FIG. 7 illustrates a process for using static resource lists to preload data.

FIG. 7 illustrates using static and dynamic resource lists to preload data, in accordance with aspects of the invention. In one embodiment of the invention, a resource list identifies resources that may be needed by an executing or soon-to-be executing program (hereinafter both referred to as "the executing program"). Resources are referenced above in relation to creating a resource list from an executing program.

For example, in one embodiment, the resource list may include a list of dynamic link libraries (dll's), executables, data files, configuration files, and the like, that may be required by the executing program.

Referring now to FIG. 7, after a start block, the process flows to block 710, where resource information is retrieved for the next resources to load from the resource list. Moving to block 720, the resource is preloaded. Flowing to decision block 730, a determination is made as to whether there are any more resources left to preload in the resource list. When there are resources left to preload, the process flows to block 710 to repeat the process. When there are not resources left to preload, the process flows to an end block and returns to processing other actions.

FIG. 8 illustrates an exemplary resource name mapping table, in accordance with aspects of the invention. According to one embodiment of the invention, each entry in a resource list includes three parameters that identify the resource. These parameters may include, for example, the file in which the resource is located, the offset within that file, and the length of the resource. In another embodiment of the invention, instead of or in addition to multiple parameters, the resource list contains a data value or key associated with a resource. For example, a resource list may include a "name" of a resource. This name may map to a sequence of bytes at a particular offset within a particular file by using a mapping table. For example, the name may map to a part of a subroutine, function, library, module, or component of an application. The mapping table may include a plurality of tuples including fields such as (resource name, file, offset, length). By specifying a resource name, the mapping table may be used to find a chunk of data from a file. The resource name may be used to find an appropriate tuple. Once a tuple has been located, the other values of the tuple may be used to access the resource. When an application is updated to a new version, the tuples in the mapping table may be updated based on the new location of data or instructions that may occur during recompilation. Using a mapping table in this manner enables a resource list to identify the same resources even after recompilation. While one exemplary way of specifying a resource has been explained, there are many different ways to specify or package the resources. For example, one other way to package content is to break it into fixed-sized pages. In that case, the items specified are the page number and/or number of pages. Any way of identifying the content is acceptable.

In an embodiment of the invention, a thread reads a resource list, item-by-item, and preloads resources, as illustrated in FIG. 7. The thread may run in the background and/or may be given a selectable priority. Depending on the priority, the thread may consume a particular amount of computing resources such as processor compute cycles and network bandwidth. The thread may or may not execute when threads of higher priority are blocking and/or not executing. Control of the preloader may also be given to the application and/or the user. Accordingly, the preloader consumption of the CPU/ memory and network resources may be controlled, rather than just relying on thread priority.

Preloader

When discussing using resource lists to preload data, a preloader may read a resource list, item-by-item, and preload the resources. In one embodiment of the invention, the preloader preloads resources from a resource list as soon as a user has logged onto the system. Even if the user logs off of the system, the preloader may keep preloading content while the user is doing (or not doing) other things, such as surfing the Internet, etc.

According to one embodiment, the preloader runs in the background. It may be configured to use a certain percentage of the available CPU cycles and/or bandwidth to the Internet, or any other resource like memory, operating system resources, and the like. The available bandwidth may vary as the user engages in different activities. For example, when a user is not utilizing the Internet, 100% of the Internet bandwidth may be available. A preloader configured to use 25% of the available bandwidth may during this time use 25% of the total bandwidth available to the Internet. At other times, the user may be surfing the Web. During these times, amount of bandwidth required by a user may vary. If, at a particular time, the user is using 50% of the total available bandwidth available from the computer to access the Internet, a preloader configured to use 25% of the available bandwidth would use 25% of the 50% remaining, i.e., 12.5% of the total available bandwidth.

Alternatively, a preloader may be configured to use a percentage of the total bandwidth available to the Internet. For example, the preloader may be configured to use 50% of the total bandwidth available to the Internet. While the preloader is actively preloading, the preloader will attempt to consume 50% of the total bandwidth available, regardless of what percentage of the bandwidth the user is currently using.

Preloading for an application may be enabled or disabled. Enabling and disabling may be done automatically or by a user. For example, at certain times a user may require all of the computational and bandwidth resources of their computing device. In a graphical user interface environment, the user may select an icon associated with the preloading and disable the preloading. Alternatively, or in addition, a user may set times in which the preloader may preload data and may also set how much computational and bandwidth resources the preloader may consume throughout a schedule. A schedule may assign the same computational and bandwidth resources for certain days, e.g. during working days one schedule may apply, and be different for other days, e.g., during weekends a different schedule may apply. A schedule for a preloader's consumption of computational and bandwidth resources may be intricate and detailed, simple, or of any type imaginable without departing from the spirit or scope of the invention.

In an embodiment of the invention, the user may enable preloading files for certain applications and/or priorities between the applications. For example, in adjusting priorities of preloading between applications, the user may assign a particular portion of the bandwidth available to a preloader to one application and another portion of the bandwidth available to the preloader to another application. Throughout this document, where it makes sense, bandwidth relates to both CPU compute cycles and the rate at which a client can send data to and receive data from a local area network or wide area network, such as the Internet.

In another embodiment of the invention, when the user assigns priorities between preloading resources for applications, the resources for the highest priority application are preloaded first. Then, the resources for the next highest priority application are preloaded, and so on.

Figure 9:
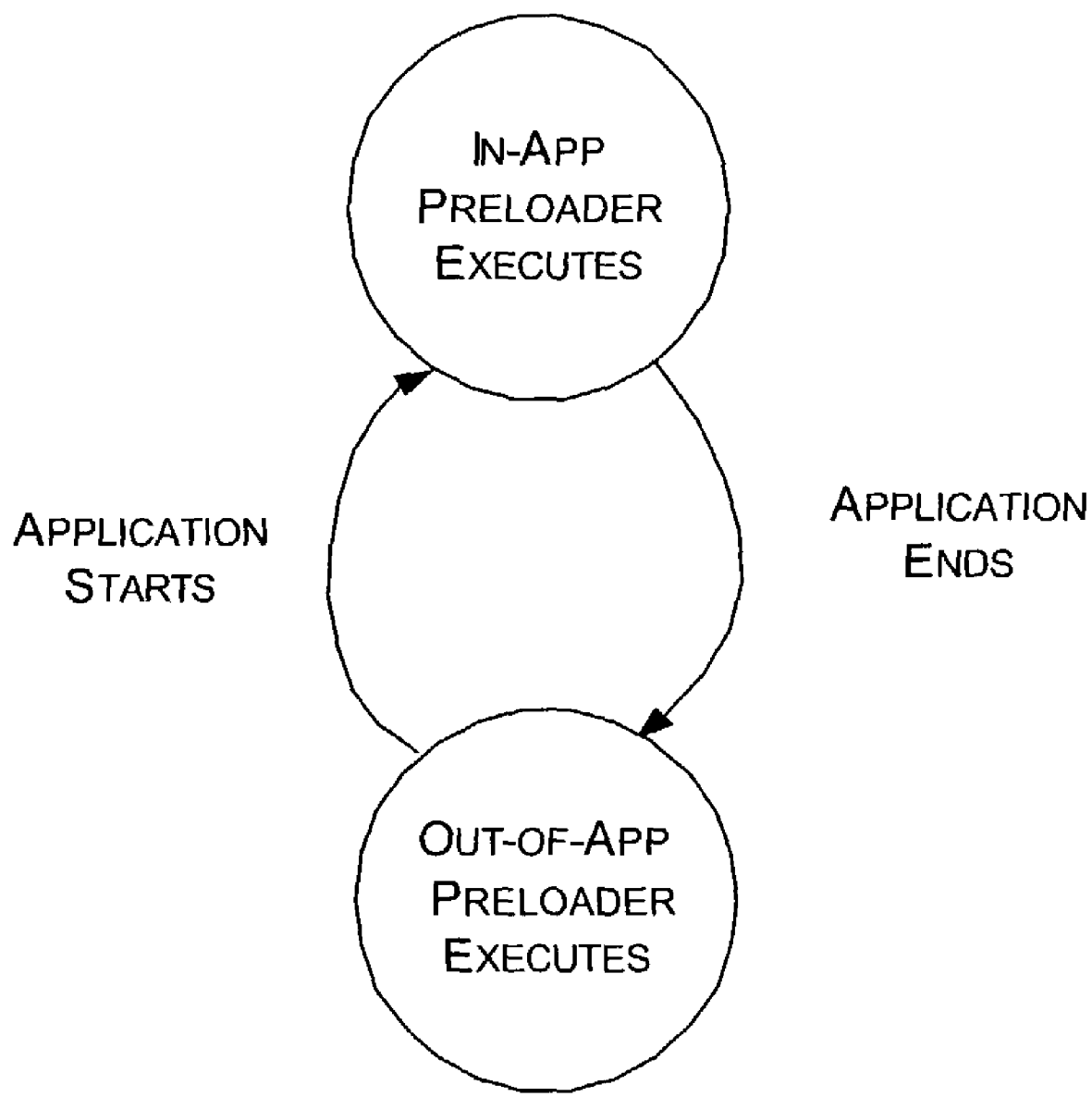
FIG. 9 illustrates a process for an out-of-app preloader.

FIG. 9 illustrates a state diagram of an in-app and out-of-app preloader executing. In one embodiment of the invention, one preloader is active before an application is launched, while another preloader is active after the application is launched. The preloaders may communicate through the use of a mutex or some other inter-process communications mechanism. The preloader that is active before an application is launched may be referred to as an out-of-app preloader (hereinafter referred to as either "out-of-app preloader" or "preloader"), while the preloader that is active when the application is executing may be referred to as an in-app preloader (hereinafter referred to "in-app preloader"). According to another embodiment, one preloader handles preloading for the application both while it is executing as well as when it is not executing when the presence of the application can be determined automatically.

Figure 10:
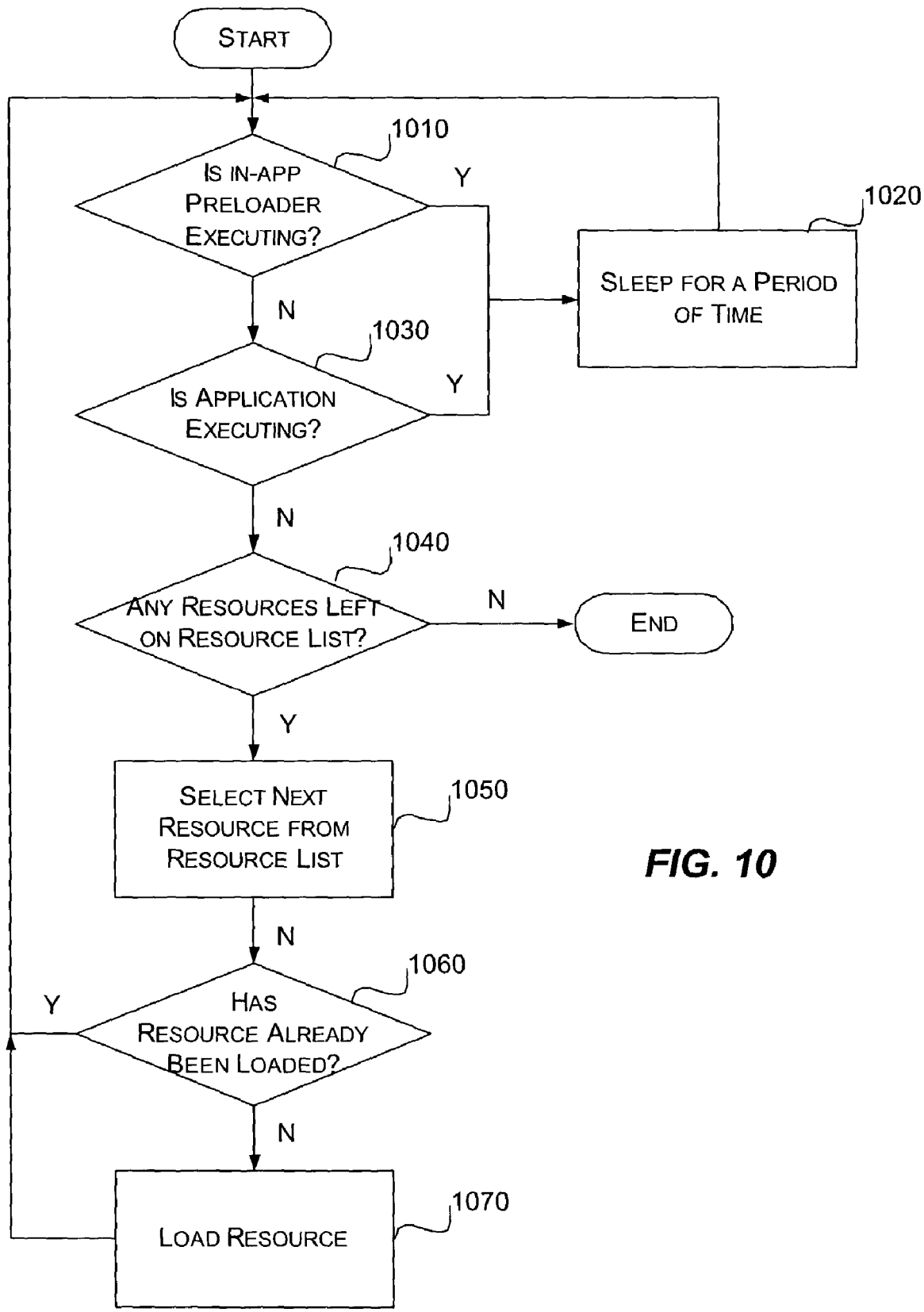
FIG. 10 shows a process for in-app preloader execution.

FIG. 10 shows a process for in-app preloader execution, in accordance with aspects of the invention. The preloader may preload resources based on a static resource list that may be updated with resource lists associated with hints as described earlier. When the preloader determines that the application has launched, the preloader may suspend itself from executing. In doing so, the preloader may discard the resource (or chunk of a resource) which it was currently trying to load, finish loading the resource or chunk of data before suspension, or indicate how much of the resource or chunk it was able to preload before suspending. When the preloader resumes preloading resources, it may start with where it left off.

Some time after suspension, the preloader may be activated by the operating system or some other mechanism. Upon renewed execution, the preloader may check to see if the application is executing (block 1010). If it is, the preloader may suspend itself for another period of time (block 1020). This may continue until the preloader determines that the application is no longer executing (block 1030), for example, when a mutex is released. According to another embodiment of the invention, the preloading may be enabled and disabled in an event-driven manner. At this point, the preloader may resume preloading files where it left off.

When the preloader resumes preloading resources, it may determine that one or more resources that it was going to preload were loaded by the application or an in-app preloader (block 1060). The preloader may make this determination by checking a cache, memory, a file system I/O API, or some other location, to see if the file is already located local to the client. If so, the preloader may simply proceed to the next resource to load in the resource list (block 1050). The preloader may determine the next resource, too, was already preloaded by the application or an in-app preloader. As part of its procedure, the preloader may simply check to determine whether a resource in a resource list already exists locally. The term "locally" refers to the resource stored in a point that is more or less instantly accessible and of high bandwidth. For example, the resource may be stored in memory, hard drive, LAN server cache, proxy, and the like. The term locally is not restricted to residing only on the user's machine If the resource does exist locally, the preloader may skip to the next resource and check to see if it already exists locally. This may continue until the preloader has stepped through all of the resources in a resource list (block 1040) or until the preloader finds a resource that needs to be preloaded. When the preloader finds a resource that needs to be preloaded, it may begin preloading the resource (block 1070).

These methods of preloading are directed at transferring resources from servers onto the user's local storage devices in order that the resources may be accessed much faster and with less chance of error than if they remained on the server. However, space on the user's local storage devices may be limited, and/or shared between multiple applications being preloaded. The user may also choose to ration the amount of local storage space that the content delivery system can use. Therefore there may be occasions when there is not enough space in the local storage area to hold all the resources that the preloader intends to load. If this occurs, any of a number of local-storage-space-management policies may be employed. Resources may be purged from the local storage system based on a "least recently used" algorithm or any other appropriate algorithm, in order to make room for new preloaded resources. As resources that have been recently used by the application are often likely to be requested again, such "least recently used" purging may also be limited to resources that meet certain other criteria, such as "not used for X hours". When using the 'prediction graph and predictor component' algorithms described earlier, it may be advantageous to track which resources were preloaded due to these state-driven predictions, and when the application chooses a particular path forward through the prediction graph (i.e. makes a specific resource request), then mark any 'failed predictions' (resources that were predicted due to looking ahead down the branches in the graph that were not taken by the application), as being more suitable for purging if space needs to be reclaimed.

Figure 11:
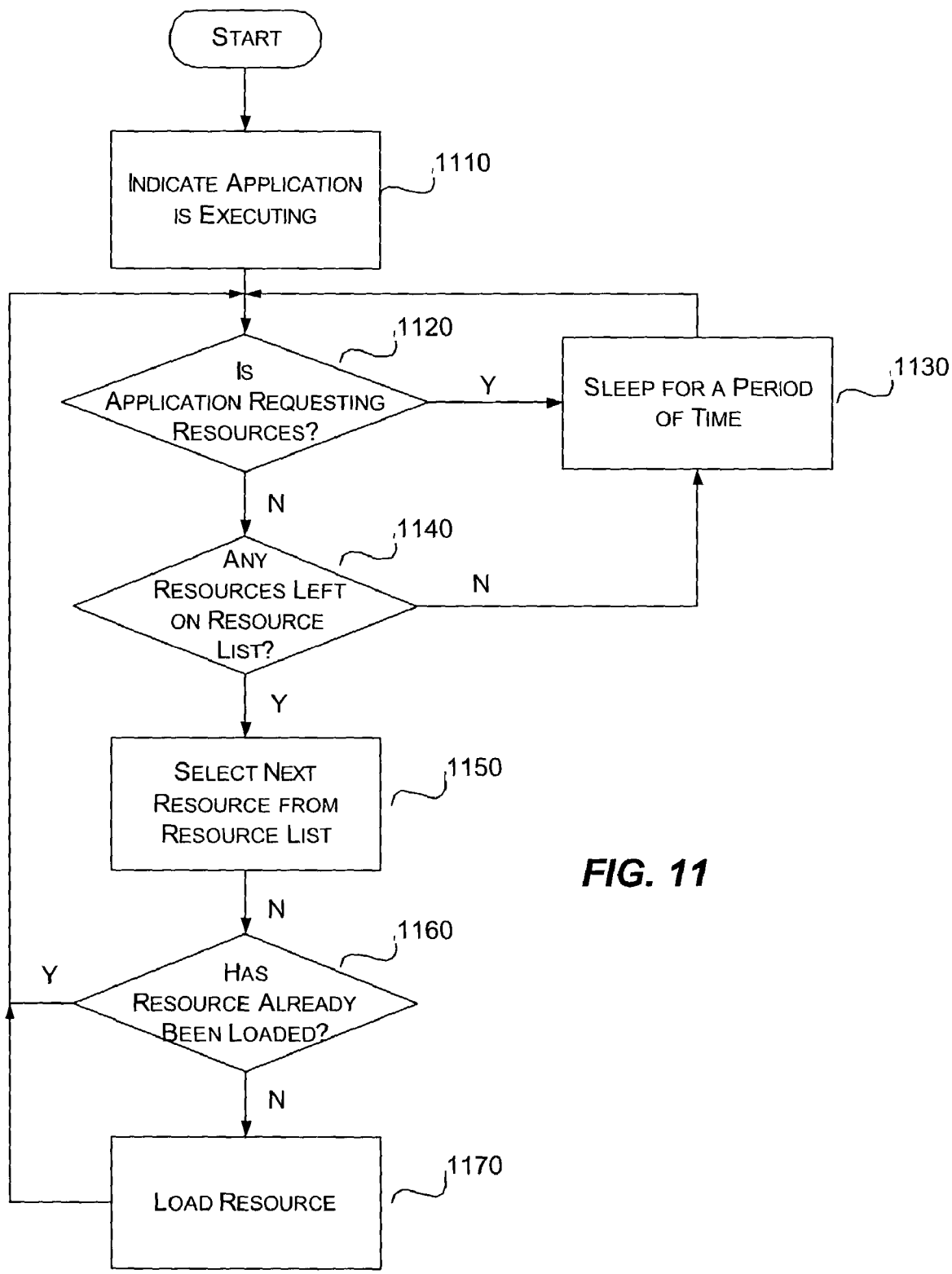
FIG. 11 illustrates a process flow of an in-app preloader.

FIG. 11 illustrates a process flow of an in-app preloader, in accordance with aspects of the invention. The process illustrated in FIG. 11 is substantially similar to the process illustrated in FIG. 10 with the exception of blocks 1110 and 1120. Upon execution of an application, the application indicates that it is executing (block 1110). The application may use a mutex, or utilize a call within an API to signal to a preloader that the application is now executing. Alternatively, or in addition, an in-app preloader may use a mutex (or some other inter-process communications mechanism) to signal to the out-of-app preloader that the in-app preloader is executing. Decision block 1120 is used to determine if the application is requesting resources. These resources may be requested directly from an application executing or through the use of hints or a predictor based on the application states.

In one embodiment of the invention, the in-app preloader uses a different resource list for preloading resources than the out-of-app preloader. An application, for example, may dynamically provide a resource list to an in-app preloader based on events that occur while the application is executing. Alternatively the same resource list may be used while the application is executing and when it is not executing. Furthermore, the application may have a set of resources that would be more beneficial to be preloaded than the set of resources that an out-of-app preloader would normally preload. When an in-app preloader begins preloading resources (based on a dynamic or static resource list), the in-app preloader may determine that the out-of-app preloader has already loaded one or more resources that the in-app preloader would have loaded. In such cases, the in-app preloader may skip to the next resource similar to how the out-of-app preloader skipped to the next resource when the out-of-app preloader determined that a file was already loaded. This skipping of files may be accomplished by the same mechanism. That is, both an out-of-app preloader and an in-app preloader may call a file system I/O API to load a particular resource. If the file system I/O API determines that the file is found locally, it may simply report to the calling preloader that the file has been loaded. Thus, in one embodiment of the invention, both out-of-app and in-app preloaders can be implemented that call a common API to load files. The file may be stored in a cache, a data store, or some combination of permanent and non-permanent memory.

In one embodiment of the invention, the preloader initially loads a minimum set of resources needed to start an application. This minimum set of resources may be referred to as a minimum footprint. Generally, such resources must be present on the client before an application executes. This minimum footprint might include a file system I/O API that enables the application to request other resources as needed.

Some sets of resources may require that an entire file be preloaded before any of the resources are accessed. Some examples include wav files, mp3 files, and other files that need to be passed off to another system, such as a player or operating system external to the application. These resources may indicate that a set of such resources must be loaded together before any of the resources in the set are considered "available" to the application.

In one embodiment of the invention, resource lists may indicate that some resources should be pinned into memory, either on the hard drive, RAM, or some other storage. When a resource has an indication that it should remain in memory, it may cease to be subject to replacement under a least recently used (LRU) algorithm or some other resource replacement strategy.

Through the course of loading resources and minimum footprints, the user experiences the installation of an application. For example, icons associated with applications may be placed on the desktop of a windowing environment. Icons may also be placed in the Microsoft Windows® "Start Menu". The user has the same experience as any typical installation of an application even though the entire application is not loaded onto the user's machine.

A preloader, however, may or may not wait until such icons are accessed or clicked upon before beginning to preload resources associated with the application which the icons represent. Accessing one icon may cause a preloader to begin preloading a resource for an application not directly related to that icon. For example, the preloader may determine that if a user accesses one application that the user has a high probability of accessing another application. In these cases, upon selection of an icon, resources for a set of applications may begin to be preloaded.

In some cases, an application may need a resource that a preloader has not preloaded. In one embodiment of the invention, when the application needs such a resource, it may request the resource from memory, cache, file system I/O API, and the like. When an in-app preloader detects that the application has requested a resource, the in-app preloader may suspend itself and remain suspended until the application's resource request is fulfilled. To determine when the application has received its requested resource, the in-app preloader may enter a loop in which it sleeps, awakes and checks the status of the application request, and sleeps again if the resource has not yet been transferred to a local storage device.

In some embodiments of the invention, resources may be requested in 32 kilobyte and/or 64 kilobyte chunks. The chunk size may be selected manually or automatically and may be set to a size other than 32 or 64 kilobytes.

In another embodiment of the invention, a client may have multiple channels of communication with a content server. For example, an in-app preloader may send requests and receive data on one channel, an out-of-app preloader may send requests and receive data on another channel, and an application may send requests and receive data on yet another channel. A server may receive a request on one channel and then receive a request on another channel from the same client. If the new request is from a channel of a higher priority, the server may stop fulfilling the request from any lower channel until the higher priority channel's request is satisfied. In such embodiments, it may be unnecessary for the client's out-of-app preloader to check whether an in-app preloader or application is executing because by setting priorities, the server may be configured to transfer data to the out-of-app preloader when the server was not servicing a request from the in-app preloader or the application. Likewise, it may be unnecessary for the in-app preloader to check whether the application is requesting data. By setting priorities, a server may be configured to send data to the in-app preloader when the server is not servicing a request from the application.

According to another embodiment, a single preloader is used for in-app preloading and out-of-app preloading. Instead of individual preloaders for each application, an engine manages preloading. During in-app preloading the application may send requests using an API call to the preloader. For example, a player is nearing the next level in the game, and the application requests the resources needed for the next level from the preloader. During out-of-app preloading the preloader may load resources from a resource list. In other words, the resource list is static when the application is not executing, and is a dynamic resource list when the application is executing. When the application begins executing it registers with the preloader that it is executing. This embodiment has many advantages. For example, the application consumes less resources on the client since it doesn't store a copy of the preloader. Additionally, there is a central point from which to control preloading of resources.

Figure 12:
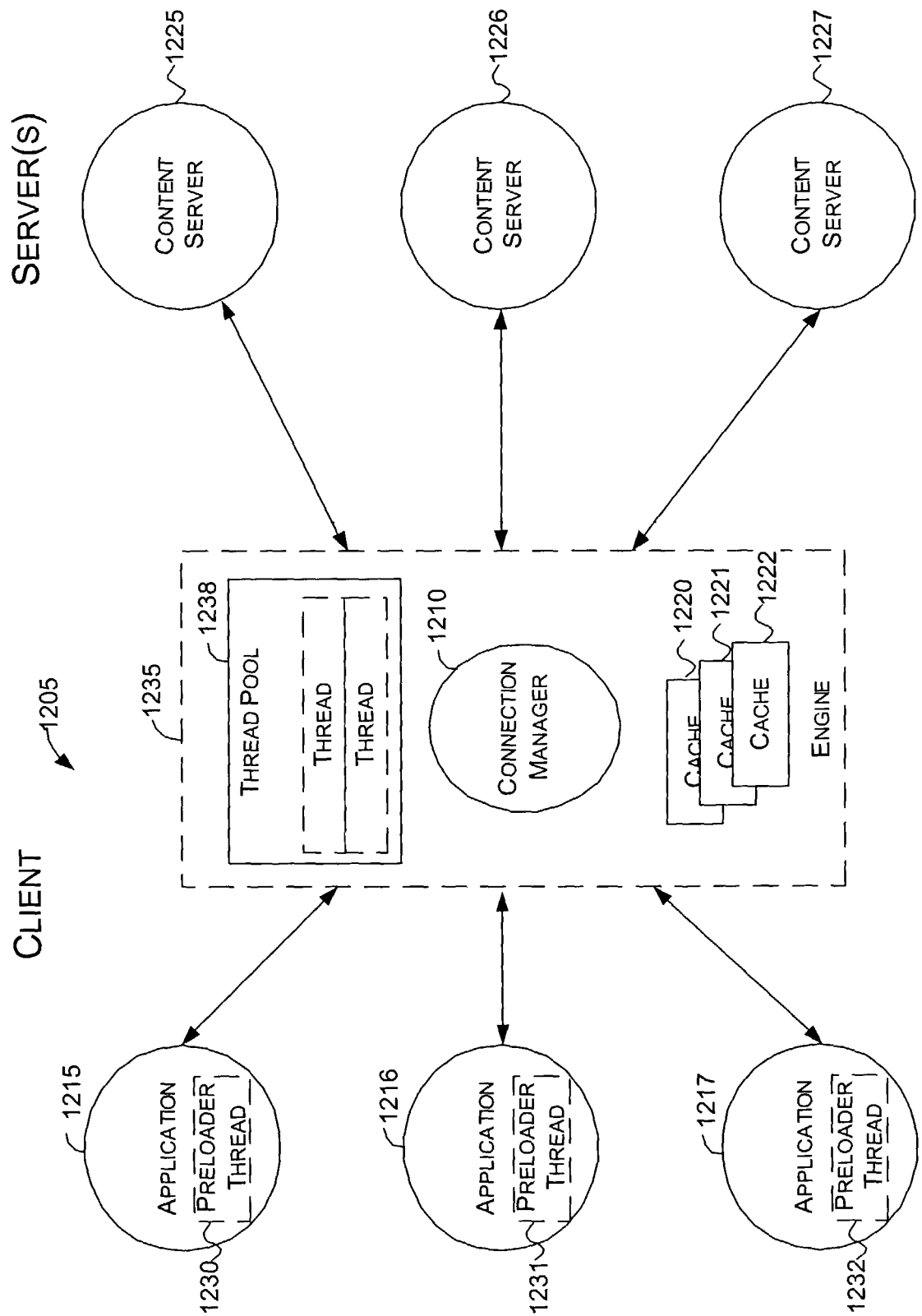
FIG. 12 shows a preloader system.

FIG. 12 shows a preloader system, in accordance with aspects of the invention. Client 1205 may include connection manager 1210 and one or more applications, such as applications 1215-1217. Each application may be associated with one or more caches, such as caches 1220-1222. In another embodiment of the invention, all of the applications are associated with a single cache. That is, a single cache may store content for more than one application. The caches may be stored on a computer-readable medium located on client 1205 or easily accessible by client 1205, such as on a server coupled by a LAN to client 1205.

Content may be divided into one or more resources. When a client computer first requests an application, such as a game, the resources of the game may be located solely on a content server. The executable code and data that comprises the application may both be divided into blocks. Each of these blocks could be considered a resource needed by the application to continue or complete execution.

Some of the blocks of executable code of the application may be downloaded from the server and stored on the client computer. After a sufficient number of blocks are downloaded, the application may start executing with the blocks that are currently available on the client computer. Before or when the application comes to a part in the code in which it needs code located on the content server, the application may request a block of code containing the needed code. This block of code would be a resource needed by the application to continue or complete execution.

A resource may be identified by information including the name of the file together with an offset in the file and bytes requested. The file may be a data file, a dynamic link library, an executable program, a component, and the like. Resources may also include such things as a processor, memory, a printer, a display adapter, a network adapter, a storage device such as a hard disk, CD-ROM, DVD disk, or other optical disk, and the like, although it will be recognized that these devices would not be downloaded from a content server to a client computer.

Client 1210 is coupled by a WAN/LAN (not shown) to one or more servers, such as servers 1225-1227.

In one embodiment of the invention, each application is associated with a preloader thread. For example, application 1215 may be associated with preloader thread 1230. Preloader thread 1230 is in charge of obtaining content that application 1215 currently needs or will shortly need. Preloader thread 1230 may know which content application 1215 will shortly need by examining a static resource list previously generated. For example, application 1215 may be instrumented to output a list of which resources it accesses during a sample execution. Application 1215 may be executed several times under varying circumstances to obtain a representative or constructed list of resources typically needed by application 1215.

When application 1215 is using resources that are currently available on client 1215, preloader thread 1230 may request resources from the static resource list to be retrieved from a content server. As requested resources are received, they may be stored in a cache associated with application 1215, such as cache 1220. Then, when application 1215 requires the resource, it may be retrieved from a computer storage medium locally accessible rather than a content server.

When application 1215 requires a resource that is not locally accessible on client 12415, application 1215 may utilize preloader thread 1230 or may directly request the resource from engine 1235. After the resource is retrieved, it may then be stored in a cache associated with application 1215. In addition, the resource may then be provided to application 1215 for use.

In another embodiment of the invention, each application (1215-1217) receives preloaded resources directly from engine 1235. According to this embodiment, an application informs engine 1235 of its current status. In response to the status, engine 1235 requests any resources that are needed by the application. These resources may be sent to the application or may be stored in a cache. Engine 1235 may manage a thread pool (1238) that contains threads relating to the resources to be preloaded that are associated with the applications.

Connection manager 1210 may be used to manage the retrieval of resources from one or more content servers. For example, connection manager 1210 may receive requests for resources from one or more applications, such as applications 1215-1217, or preloader threads, such as preloader threads 1230-1232. Connection manager 1210 may also operate on user configuration data. For example, a user may configure connection manager 1210 to use no more than a particular percentage of available bandwidth the computer has to the Internet.

When an application becomes active and actively requests resources, connection manager 1210 may suspend preloading resources for non-active applications and devote all available bandwidth that has been allotted by a user to connection manager 1210 to retrieve resources for the active application. The application may also request resources and place them in a cache associated with the application.

In one embodiment of the invention, connection manager 1210 is integrated with an application. That is, when only one application is executing, it may not be necessary to have connection manager 1210 managing connections from multiple applications. Rather, its functionality may be included in an application.

Connection manager 1210 may have one or more connections to content servers 1225-1227. In some embodiments of the invention, a single content server, such as content server 1226, has sufficient bandwidth to service the needs of multiple clients. In other embodiments of the invention, multiple content servers may be required to service the needs of one or more clients. A connection manager that determines that it needs the bandwidth of more than one content server may open connections to more than one content server to obtain content.

Connection manager 1210 may have more than one connection to one content server. For example, connection manager 1210 may request content for more than one application at a time. The content may all reside on one content server, such as content server 1226. Connection manager 1210 may open one connection for content for each application.

More preferably, however, connection manager 1210 maintains only one connection with each content server which has content connection manager 1210 is requesting. Despite some added complexity in multiplexing content through one connection, this has added benefits in minimizing the number of connections to a content server. If every connection manager from every client were to open multiple connections to each content server, these limited connections might be rapidly consumed.

In addition, connection manager 1210 may close a connection when the connection is not being used. This may also help the connection capacity of content servers.

Illustrative Operating Environment

Figure 1:
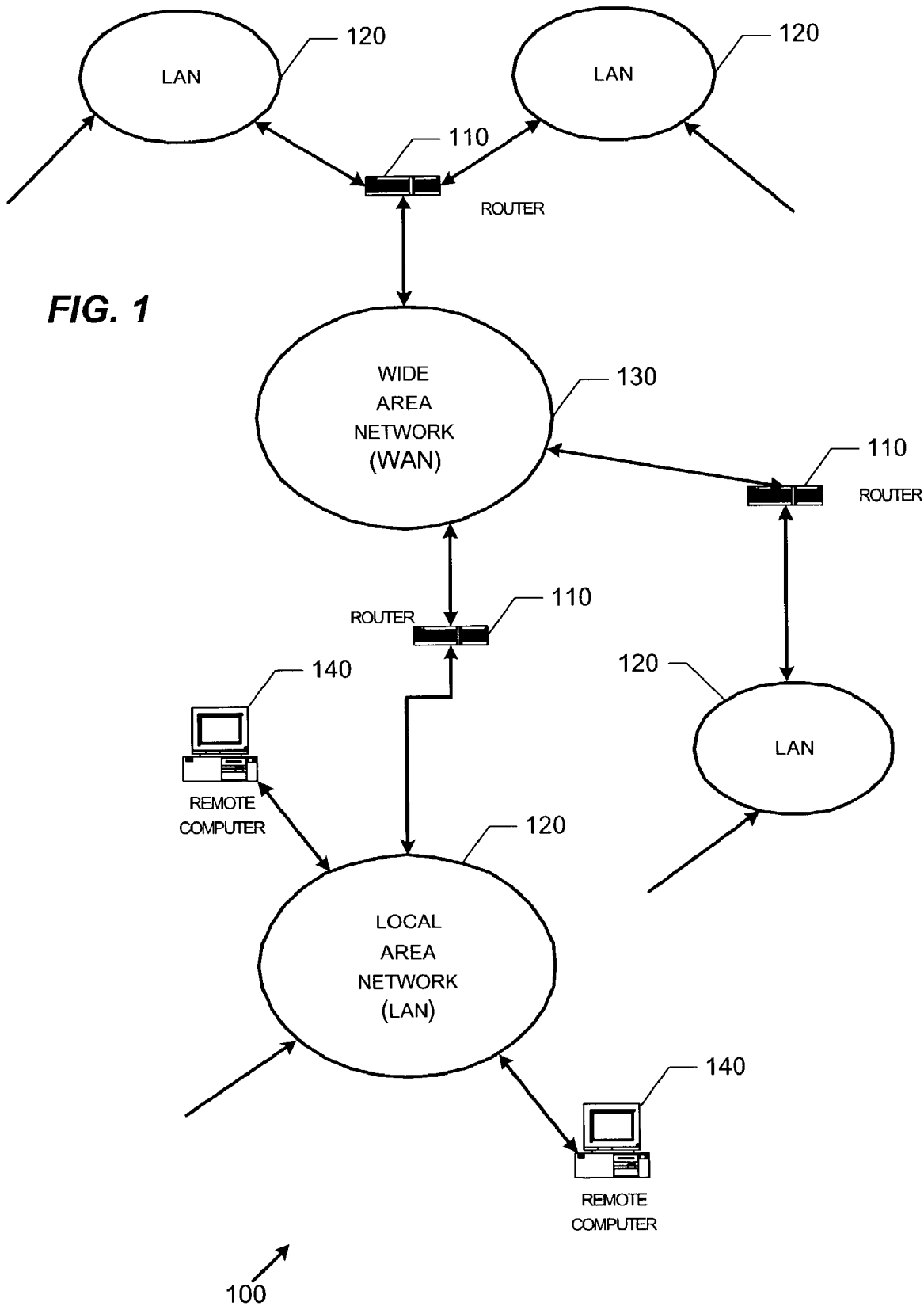
FIGS. 1-3 show components of an exemplary environment in which the invention may be practiced.
Figure 2:
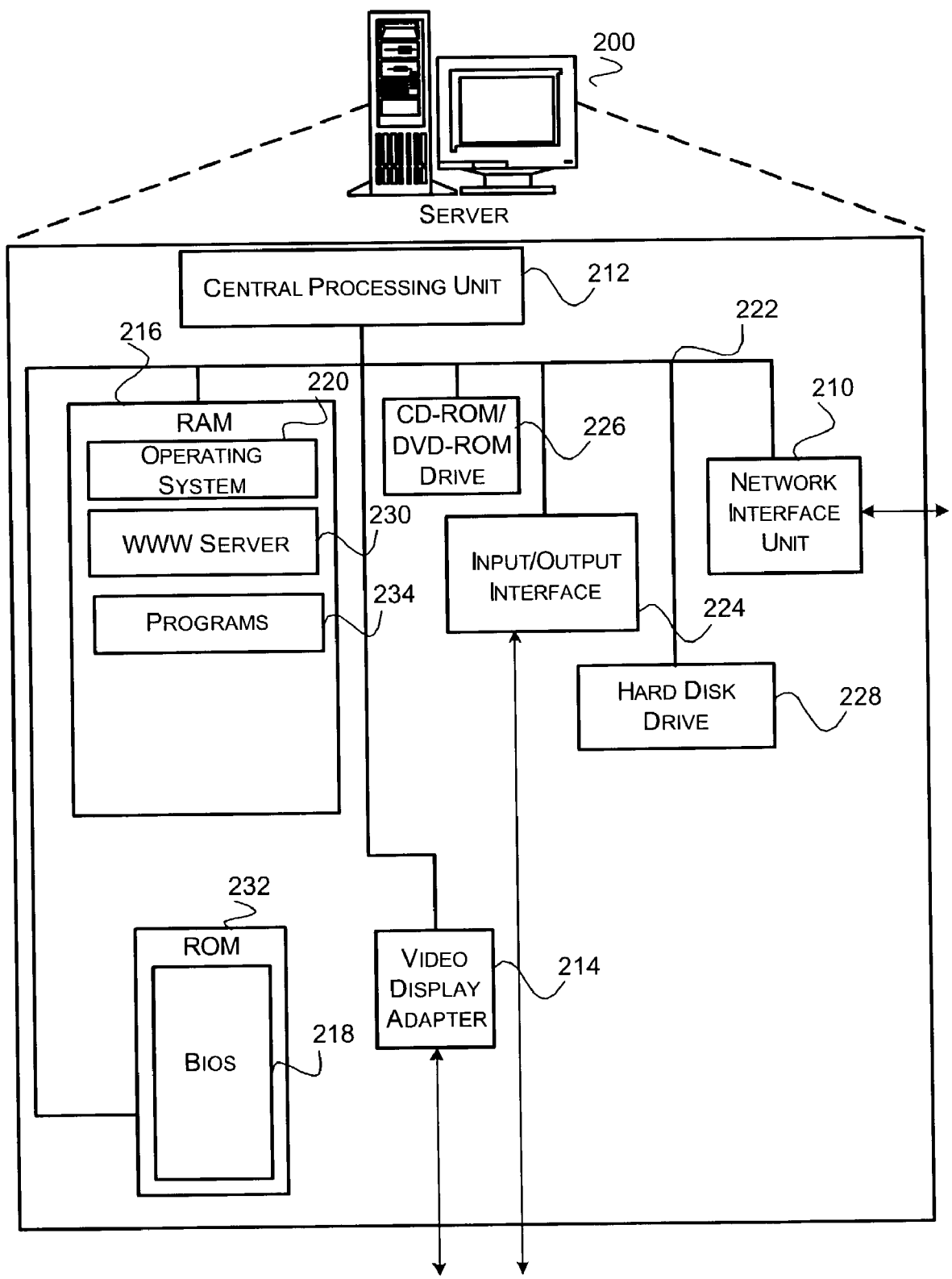
Figure 3:
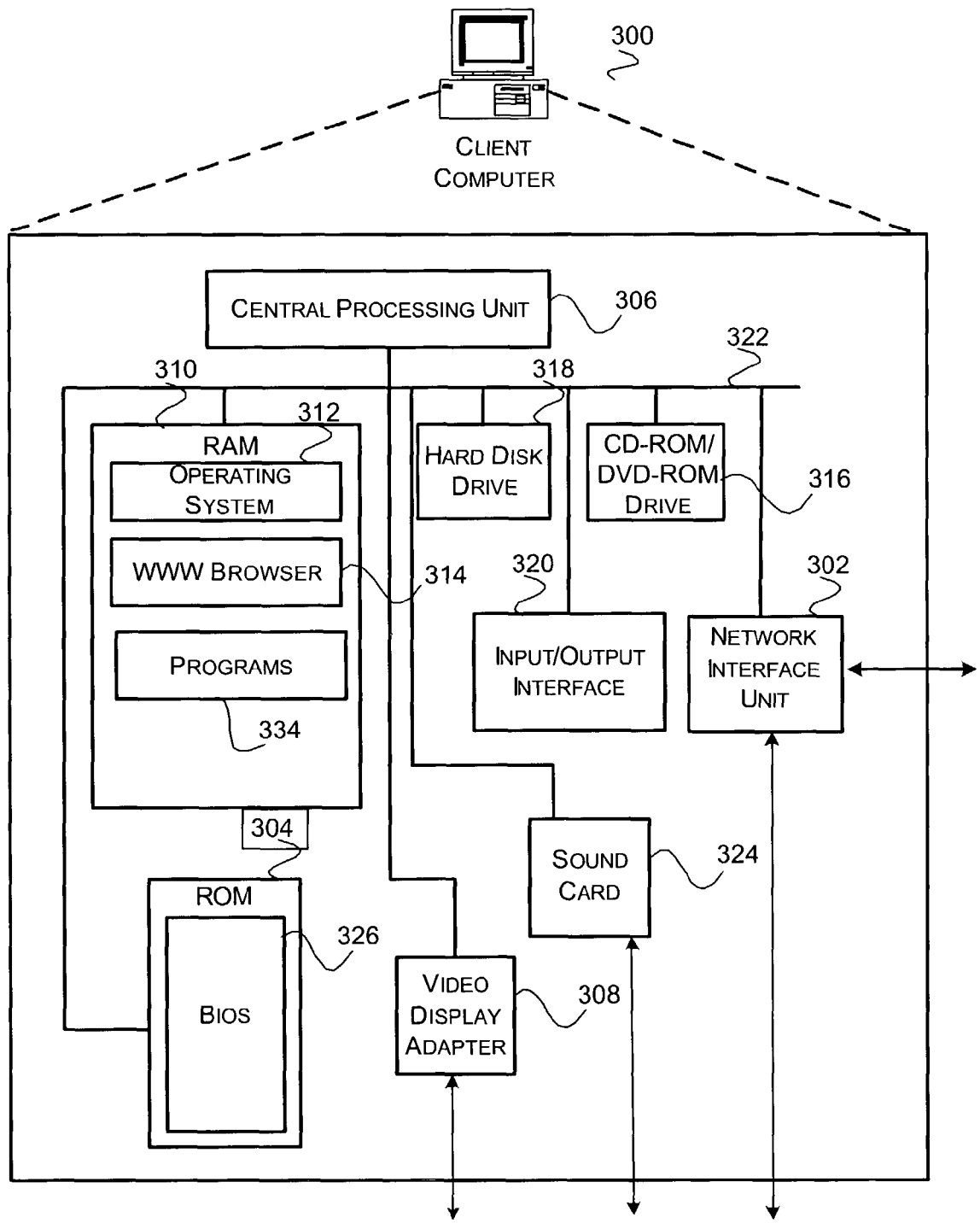

FIGS. 1-3 show components of an exemplary environment in which the invention may be practiced. Not all of the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the World Wide Web (WWW). Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server, such as the server shown in FIG. 2, may provide a WWW site, be a content server, a game server, an authentication server, etc. When providing Web pages, the server may have storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. A WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, other content, and/or services, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network.

Server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. The network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Client computer 300 may include many more components than those shown in FIG. 3. However, it is not necessary that those conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

In this disclosure, references will be made to client and server. Where appropriate, client should be construed to refer to a process or set of processes that execute on one or more electronic device, such as client computer 300 of FIG. 3. A client is not limited, however, to running on a client computer. It may also run on a server, such as WWW server 200 or be distributed among various electronic devices, wherein each device might contain one or more processes or routines that together constitute a client application. Where appropriate, client should be construed, in addition or in lieu of the discussion above, to be a device upon which one or more client processes execute, for example, client computer 300 or WWW server 200.

Similarly, server should be construed to refer to a process or set of processes that execute on one or more electronic devices, such as WWW server 200. Like a client, a server is not limited to running on a server computer. Rather, it may also execute on what would typically be considered a client computer, such as client computer 300 of FIG. 3, or be distributed among various electronic devices, wherein each device might contain one or more processes or routines that together constitute a server application. Where appropriate, server should be construed, in addition or in lieu of the discussion above, to be a device upon which one or more server processes execute, for example, server 200 or client computer 300.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, Blum-BlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++ v4.x, an open-source class library of cryptographic techniques, the source code of which is hereby incorporated by reference, may be used in encrypting or decrypting applications and/or data. Other encryption and decryption libraries, both open source, commercial, and/or proprietary may be used without departing from the spirit or scope of the invention.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for secure hash algorithm 1. SHA1 is a cryptographic hash algorithm that produces a 160-bit hash value from an arbitrary length string. In other embodiments of the invention other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data.

For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in the Bible. A RSA signature may be created and/or formatted as described in RSA's PKCS #1 v2.0, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is CryptoAPI, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for preloading resources for an application on a client device, comprising:
   determining a resource list to preload onto the client device, wherein determining the list of resources, further comprises:
      determining a plurality of N-order Markov Chains based on a plurality of application hints associated with a previous execution of the application, wherein N is greater than 1;
      combining the plurality of N-order Markov Chains into a prediction graph based on at least one of Bayes' Theorem or a subsequence matching algorithm; and
      reducing the prediction graph to constrain a size of the prediction graph, the prediction graph being useable to generate the list of resources; and
   employing the resource list to preload at least one resource onto the client device before the application needs the at least one resource;
   receiving an application hint associated with the application;
   in response to the application hint, dynamically changing, by the client device, the resource list by, wherein dynamically changing the resource list comprises:
      adding within the list another resource to preload based on the application hint, the other resource to preload being added to the list at a location within the list based on a priority associated with the resource; and
      identifying which resource on the list should be loaded next into a memory local to the client device; and
   preloading the client device with the resources based on the changed resource list, wherein if the resources are located on a server device, then downloading the resources from the server device, and storing the downloaded resources locally on the client device, and obtaining the resources locally if the resources are stored on the client device, the application being configured to execute with a subset of the resources associated with the application.

2. The method of claim 1, wherein the application hint is received from the application based in part on an execution of the application.

3. The method of claim 1, wherein the resource list further comprises at least one block of code of the application that enables the application to at least one of continue to execute or to complete execution.

4. The method of claim 1, wherein changing, by the client device, the resource list by adding within the list the resource to preload further comprises determining a current state of the application.

5. The method of claim 1, wherein the application hint is associated with a next state of a game application.

6. The method of claim 1, wherein the resource list is associated with an application before the application is released.

7. The method of claim 1, wherein the at least one resource is preloaded before the application is launched.

8. A client computer for preloading resources for an application, comprising:
   a network interface component for receiving and sending information;
   a processor, in communication with the network interface component, that includes machine instructions that cause the processor to perform actions, including:
      determining a list of resources to preload onto the client computer, each preload resource having a priority for preloading, wherein determining the list of resources, further comprises:
         determining a plurality of N-order Markov Chains based on a plurality of application hints associated with a previous execution of the application, wherein N is greater than 1;
         combining the plurality of N-order Markov Chains into a prediction graph based on at least one of Bayes' Theorem or a subsequence matching algorithm; and
         reducing the prediction graph to constrain a size of the prediction graph, the prediction graph being useable to generate the list of resources; and preloading at least one resource in the list of resources based on the priority associated with the at least one resource;

receiving an application hint associated with an execution of the application;

in response to the application hint, revising, by the client computer, the list of resources by adding another preload resource associated with the application hint at a location within the list of prioritized resources identified by a priority of the other preload resource, wherein the other preload resource associated with the application hint is added to the list of resources before the application needs the other preload resource; and preloading the resources based on the revised list of resources.

9. The client computer of claim 8, wherein the application hint is based on a current state of the application.

10. The client computer of claim 8, wherein the resource is at least one of a dynamic link library, an executable, a data file, or a configuration file.

11. The client computer of claim 8, the actions further comprising:

modifying information associated with a resource local to the client computer such that modifying the information minimizes a likelihood that the resource is purged from the client computer.

12. The client computer of claim 8, wherein the application hint is one of a plurality of received application hints, and wherein revising the list of prioritized resources is based on an order in which the plurality of application hints is received.

13. The client computer of claim 8, wherein receiving the list of resources further comprises receiving the list from a server.

14. The client computer of claim 8, the actions further comprising:

modifying a priority of at least one resource within the list of resources based in part on the application hint.

15. The client computer of claim 8, wherein the application hint is based on at least one of a current state of the application, a next state of the application, or a heuristic.

16. The client computer of claim 8, the actions further comprising executing the application before all resources within the list of resources are available on the client.

17. The client computer of claim 8, wherein the application hint further comprises another list of resources for use in preloading.

18. The client computer of claim 8, wherein the application is a game application.

19. The client computer of claim 8, wherein the application hint is based on a next game level associated with the application.

20. The client computer of claim 8, wherein the at least one resource is preloaded before the application is launched.

21. A manufacture including a computer-readable non-volatile storage medium having computer-readable components therein useable in preloading resources for an application, comprising:

an application that is configured to provide an application hint during execution of the application, the application hint including a request for a preloading of a resource and a priority associated with the preload resource;

a predictor that is operative to perform actions, including:

determining a list of resources to preload onto the computer-readable non-volatile storage medium, each preload resource within the list having a priority for preloading, wherein determining the list of resources comprises eliminating resources from this list that are already present on the computer-readable non-volatile storage medium, and wherein determining the list of resources, further comprises:

determining a plurality of N-order Markov Chains based on a plurality of application hints associated with a previous execution of the application, wherein N is greater than 1;

combining the plurality of N-order Markov Chains into a prediction graph based on at least one of Bayes' Theorem or a subsequence matching algorithm; and reducing the prediction graph to constrain a size of the prediction graph, the prediction graph being useable to generate the list of resources; and a preloader that is operative to perform actions, including:

pre-loading at least one resource in the list of resources based on the priority associated with the at least one resource;

receiving the application hint from the application;

revising, by the computer-readable non-volatile storage medium, the list of resources by adding the preload resource associated with the application hint at a location within the list of prioritized resources identified by the priority of the other preload resource; and employing the revised list of resources to preload at least one other resource such that the application is configured to be executed by at least one processor with a subset of the resources associated with the application.

22. The computer-readable storage medium of claim 21, wherein the list of resources is allocated across a plurality of stacks based on a priority associated with each resource within the list of resources.

23. The computer-readable storage medium of claim 21, wherein determining the list of resources further comprises creating a prediction graph based on application resource request states and transitions between the states.

24. The computer-readable storage medium of claim 21, wherein determining the list of resources further comprises employing a predication graph to generate the list of resources.

25. The computer-readable storage medium of claim 21, wherein determining the list of resources further comprises: if a resource within the list of resources is located locally on a client, removing the resource from the list of resources.

26. The computer-readable storage medium of claim 21, wherein the at least one resource is preloaded before the application is launched.

27. A manufacture including a computer-readable non-volatile storage medium having computer-readable components therein useable in preloading resources for an application, comprising:

an application that is configured to provide an application hint during execution of the application, the application hint including a request for a preloading of a resource and a priority associated with the preload resource;

a predictor that is operative to perform actions, including:

determining a list of resources to preload onto the computer-readable non-volatile storage medium, each preload resource within the list having a priority for preloading, wherein determining the list of resources comprises eliminating resources from this list that are already present on the computer-readable non-volatile storage medium; and a preloader that is operative to perform actions, including:

pre-loading at least one resource in the list of resources based on the priority associated with the at least one resource;

receiving the application hint from the application;

revising, by the computer-readable non-volatile storage medium, the list of resources by adding the preload resource associated with the application hint at a location within the list of prioritized resources identified by the priority of the other preload resource; and employing the revised list of resources to preload at least one other resource, wherein determining the list of resources, further comprises:

determining a plurality of N-order Markov Chains based on a plurality of application hints associated with a previous execution of the application, wherein N is greater than 1;

combining the plurality of N-order Markov Chains into a prediction graph based on at least one of Bayes' Theorem or a subsequence matching algorithm; and reducing the prediction graph to constrain a size of the prediction graph, the prediction graph being useable to generate the list of resources.

* * * * *